US007822631B1

(12) United States Patent
Vander Mey et al.

(10) Patent No.: US 7,822,631 B1
(45) Date of Patent: Oct. 26, 2010

(54) ASSESSING CONTENT BASED ON ASSESSED TRUST IN USERS

(75) Inventors: Christopher D. Vander Mey, Seattle, WA (US); Arijit Ghosh, Mercer Island, WA (US); Brian David Marsh, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1349 days.

(21) Appl. No.: 11/290,623

(22) Filed: Nov. 30, 2005

Related U.S. Application Data

(63) Continuation-in-part of application No. 10/646,341, filed on Aug. 22, 2003, and a continuation-in-part of application No. 11/165,842, filed on Jun. 24, 2005, which is a continuation-in-part of application No. 10/646,341, filed on Aug. 22, 2003, and a continuation-in-part of application No. 11/024,006, filed on Dec. 27, 2004.

(51) Int. Cl.
*G06F 17/30* (2006.01)
(52) U.S. Cl. ........................................................ 705/10
(58) Field of Classification Search .................... 705/10
See application file for complete search history.

(56) References Cited

U.S. PATENT DOCUMENTS 6,041,311 A * 3/2000 Chislenko et al. ............. 705/27
6,064,980 A * 5/2000 Jacobi et al. .................. 705/26
6,260,019 B1 * 7/2001 Courts ........................... 705/1
6,263,447 B1 7/2001 French et al. ............... 713/201
6,334,127 B1 * 12/2001 Bieganski et al. .................. 1/1
6,438,579 B1 * 8/2002 Hosken ...................... 709/203
6,466,917 B1 10/2002 Goyal et al.
6,505,202 B1 * 1/2003 Mosquera et al. ............. 707/10
6,895,385 B1 * 5/2005 Zacharia et al. ............... 705/10
6,952,678 B2 10/2005 Williams et al.
2002/0004772 A1 1/2002 Templeton et al. ............ 705/35
2002/0046041 A1 4/2002 Lang
2002/0107861 A1 * 8/2002 Clendinning et al. ........ 707/101
2002/0133365 A1 9/2002 Grey et al.

(Continued)

OTHER PUBLICATIONS

O'Connor et al "(PolyLens: A Recommender System for Group Users", Dec. 1997, pp. 1-20.*

(Continued)

*Primary Examiner*—Romain Jeanty
(74) *Attorney, Agent, or Firm*—Seed IP Law Group PLLC

(57) ABSTRACT

Techniques are described for managing content by identifying content that has attributes of interest (e.g., content that is useful, humorous and/or that otherwise has a sufficiently high degree of quality) and by determining how to use such identified content. In some situations, a piece of content is automatically assessed in a manner based on automatically assessed levels of trust in users who are associated with the content, such as a user who authored or otherwise supplied the content and/or users who evaluated the content. For example, an automatically assessed level of trust for a user may be based on prior activities of the user and be used to predict future behavior of the user as a supplier of acceptable content and/or as an acceptable evaluator of supplied content, such as based on prior activities of the user that are not related to supplying and/or evaluating content.

65 Claims, 12 Drawing Sheets

1200

Example Trustworthiness Factor Information

| | 1202a Trustworthiness Factors | 1202b Weight | 1202c Update Frequency | 1202d Transform | 1202e Maximum Value | |
|---|---|---|---|---|---|---|
| 1201a | Relative Value of Total Purchases Over the Last Twelve Months | 1 | Monthly | Exponential | 18 | ••• |
| 1201b | Length of Time Since First Order, in Days | 1 | Monthly | Logarithmic | 18 | |
| 1201c | Corroborated Identity | 0.2 | Daily | Linear | 4 | |
| 1201d | Reviews Accepted | 1.5 | Daily | Linear | 26 | |
| 1201e | Uploaded Images Accepted | 1 | Daily | Linear | 18 | |
| 1201f | Other Supplied Content Accepted | 1 | Daily | Linear | 18 | |
| 1201g | Reviews Suppressed | −4 | Daily | Linear | −70 | |
| 1201h | Images Suppressed | −5 | Daily | Linear | −88 | |
| 1201i | Other Supplied Content Suppressed | −3 | Daily | Linear | −53 | |
| 1201j | Reputation Score From External Source AA | 1 | Daily | Linear | 10 | |
| 1201k | Reputation Score From External Source BB | .07 | Monthly | Linear | 10 | |
| | ⋮ | | | | | |

1300

Example Assessed User Trust Information

| | 1320 | 1302a | 1302b | 1302c |
|---|---|---|---|---|
| 1310 | | Jane Doe | Fred Smith | Brenda Starr |
| 1301a | Relative Value of Total Purchases Over the Last Twelve Months | 4 | 9 | 1 |
| 1301b | Length of Time Since First Order, in Days | 5 | 10 | 2 |
| 1301c | Corroborated Identity | 0.8 | 0.8 | 0 |
| 1301d | Reviews Accepted | 2 | 15 | 5 |
| 1301e | Uploaded Images Accepted | 0 | 3 | 1 |
| 1301f | Other Supplied Content Accepted | 1 | 7 | 2 |
| 1301g | Reviews Suppressed | 0 | 0 | −50 |
| 1301h | Images Suppressed | 0 | 0 | −20 |
| 1301i | Other Supplied Content Suppressed | 0 | 0 | −10 |
| 1301j | Reputation Score From External Source AA | 8 | – | 6 |
| 1301k | Reputation Score From External Source BB | 7 | 30 | – |
| 1330 | Calculated Trust Score Total | 27.8 | 47.8 | −63 |

U.S. PATENT DOCUMENTS

| | | | | |
|---|---|---|---|---|
| 2002/0198866 | A1* | 12/2002 | Kraft et al. | 707/3 |
| 2003/0236582 | A1 | 12/2003 | Zamir et al. | |
| 2004/0003401 | A1 | 1/2004 | Gutta et al. | |
| 2004/0122926 | A1 | 6/2004 | Moore et al. | |
| 2005/0034071 | A1* | 2/2005 | Musgrove et al. | 715/530 |
| 2006/0143068 | A1* | 6/2006 | Calabria | 705/10 |
| 2007/0050192 | A1* | 3/2007 | Gutta et al. | 705/1 |

OTHER PUBLICATIONS

"About Epinions," Epinions.com, retrieved Aug. 4, 2003, from http://www.epinions.com/about/, 2 pages.
"Advisor Role Transition Q&A," Epinions.com, retrieved Aug. 4, 2003, from http://www.epinions.com/help/faq/show_~faq_transition, 4 pages.
"Category Lead, Top Reviewer and Advisor FAQ," Epinions.com, retrieved Aug. 4, 2003, from http://www.epinions.com/help/faq/show_~faq_recognition, 12 pages.
"Company Overview," eBay, retrieved Aug. 4, 2003, from http://pages.ebay.com/community/aboutebay/overview/index.html, 2 pages.
"Company Overview—Trust, Safety and Privacy," eBay, retrieved Aug. 4, 2003, from http://pages/ebay.com/community/aboutebay/overview/trust.html, 2 pages.
"Explanation of the Web of Trust of PGP," Feb. 2004, retrieved Nov. 10, 2004, from http://www.rubin.ch/pgp/weboftrust.en.html, 3 pages.
"FAQ's—The Web of Trust," Epinions.com, retrieved on Nov. 10, 2004, from http://www.epinions.com/help/faq/?show=faq_wot, 4 pages.
"Frequently Asked Questions About Reviewers," Amazon.com, retrieved Jul. 31, 2003, from http://www.amazon.com/exec/obidos/subst/community/reviewers-faq.html/ref+cm_tr_trl_faq/104-1986906-044793, 3 pages.
"Frequently Asked Questions," TrueDater.com, retrieved Apr. 4, 2005, from http://www.truedater.com/index.php?action=faqs, 2 pages.
"Mission Statement" and "Advogato's Trust Metric" Advogato, retrieved Aug. 4, 2003, from http://www.advogato.com/trust-metric.html, 6 pages.
"Opinity Launches First Online Reputation Service for Internet Users," Apr. 18, 2005, Opinity.com, retrieved Jan. 5, 2006, from http://www.opinity.com/press/service_release_final.php, 2 pages.
"Papers on Reputation," retrieved Aug. 4, 2003, from http://databases.si.umich.edu/reputations/bib/bibM.cfm, 7 pages.
"Payment-On-Line (AOL, Compuserve, Internet, etc)," Oct. 20, 1994, Google Groups, retrieved Dec. 6, 2004, from http://groups-beta.google.com/group/misc.entrepreneurs/browse_thread/thread/80fcf110252bb3f7/fflc8, 3 pages.
"Rank Reviewer," Amazon.com, retrieved Aug. 4, 2003, from http://www.amazon.com/exec/obidos/tg/cm/top-reviewers-list/-/1/ref=cm-_tr_trl_faq/104-1986906-0447936, 4 pages.
"Rating Reviews on Epinions.com," Epinions.com, retrieved Aug. 4, 2003, from http://www.epinions.com/help/faq/show_~faq_rating, 2 pages.
"Reputation—eBay Feedback: Overview," eBay, retrieved Aug. 4, 2003, from http://pages.ebay.com/help/confidence/reputation-ov.html, 1 page.
"Root/News," Root.net, retrieved Dec. 20, 2005, from http://www.root.net/about/news, 3 pages.
"Stars—Earning Your Stars Through Positive Feedback," eBay, retrieved Aug. 4, 2003, from http://pages.ebay.com/help/confidence/reputation-stars.html, 1 page.
"test-Earnings on Epinions.com," Epinions.com, retrieved Aug. 4, 2003, from http://www.epinions.com/help/faq/show_~faq_earnings, 4 pages.
"The Web of Trust," Epinions.com, retrieved Aug. 4, 2003, from http://www.epinions.com/help/faq/?show=faq_wot, 4 pages.
"Web of Trust," Thawte.com, retrieved Nov. 10, 2004, from http://www.thawte.com/wot/, 1 page.
"Welcome to the Reputation Research Network," retrieved Aug. 4, 2003, from http://databases.si.umich.edu/reputations/indexM.cfm, 1 page.
Bellare, M., et al., "Security Proofs for Identity-Based Identification and Signature Schemes," May 2004, retrieved Oct. 12, 2004, from http://eprint.iacr.org/2004/252.pdf, pp. 1-53, 53 pages.
Boyen, X., "Multipurpose Identity-Based Signcryption—A Swiss Army Knife for Identity-Based Cryptography," retrieved Oct. 12, 2004, from http://eprint.iacr.org/2003/163.pdf, pp. 1-34, 34 pages.
Donath, J., "Identity and Deception in the Virtual Community," Nov. 12, 1996, retrieved Nov. 10, 2004, from http://smg.media.mit.edu/people/Judith/Identity/IdentityDeception.html, 26 pages.
Kollock, P., "The Production of Trust in Online Markets," 1999, retrieved Nov. 10, 2004, from http://www.sscnet.ucla.edu/soc/faculty/kollock/papers/online_trust.htm, 18 pages.
Lynn, R., "Keeping Online Daters Honest," Apr. 1, 2005, Wired News, retrieved Apr. 4, 2005 from http://www.wired.com/news/print/0,1294,67083,00.html, 3 pages.
OSDN, Slashdot, retrieved Aug. 4, 2003, from http://slashdot.org/faq/com-mod.shtml, 21 pages.
OSDN, Slashdot, retrieved Aug. 4, 2003, from http://slashdot.org/faq/metamod.shtml, 4 pages.
Spiegel, D. "Identity Deception," Feb. 15, 2000, retrieved Nov. 10, 2004, from http://xenia.media.mit.edu/~spiegel/classes/VirtualSociety2000/Deception.html, 2 pages.
Thompson, N., "More Companies Pay Heed to Their 'Word of Mouse' Reputation," Jun. 23, 2003, TheNewYorkTimes.com, retrieved Jun. 23, 2003, from http://www.nytimes.com/2003/06/23/technology/23REPU.html?adx..., 3 pages.
Wang, G., et al., "Remarks on Saeednia's Identity-Based Society Oriented Signature Scheme with Anonymous Signers," retrieved on Oct. 12, 2004, from http://eprint.iacr.org/2003/046.pdf, 6 pages.
Cayzer, S., et al., "A Recommender System Based on the Immune Network," Information Infrastructure Laboratory, HP Laboratories Bristol, Copyright 2002, 7 pages.
Delgado, Joaquin, et al., "Memory-Based Weighted-Majority Prediction for Recommender Systems," ACM SIGIR'99 Workshop on Recommender Systems: Algorithms . . . , 1999, 5 pages.
Littlestone, N., et al., "The Weighted Majority Algorithm," Foundations of Computer Science, 1989, 30th Annual . . . , 6 pages.
O'Connor, M., et al., "PolyLens: A Recommender System for Groups of Users," Proceedings of the European Conference on Computer . . . , 2001, 20 pages.
Tiwana, A., et al., "A Social Exchange Architecture for Distributed Web Communities," Journal of Knowledge Management, 5(3), 2001, pp. 242-248.
Burke, "Integrating Knowledge-based and Collaborative-filtering Recommender Systems," AAAI Technical Report WS-99-01, 1999, 4 pages.
Butler et al., "A Multiple Attribute Utility Theory Approach to Ranking and Selection," Management Science 47(6), Jun. 2001, 17 pages.
Konstan et al., "Recommender Systems: A GroupLens Perspective," AAAI Technical Report WS-98-08, 1998, 5 pages.
Nguyen et al., "DIVA: Applying Decision Theory to Collaborative Filtering," AAAI Technical Report WS-99-01, 1999, 7 pages.
Resnick et al., "GroupLens: An Open Architecture for Collaborative Filtering of Netnews," Proceedings of the 1994 ACM Conference on Computer Supported Cooperative Work, 1994, 12 pages.
Resnick, P., et al., "Reputation Systems," Communications of the ACM, Dec. 2000, 43(12), pp. 45-48.
Cranor, "Internet Privacy" Communications of the ACM 42(2): 29-31, Feb. 1999, 3 pages.
Friedman et al., "The Social Cost of Cheap Pseudonyms" Journal of Economics & Management Strategy, vol. 10, Issue 2, pp. 173-199; Ann Arbor, MI, Aug. 17, 2000, 32 pages.

* cited by examiner

1200

Example Trustworthiness Factor Information

| | 1202a Trustworthiness Factors | 1202b Weight | 1202c Update Frequency | 1202d Transform | 1202e Maximum Value | |
|---|---|---|---|---|---|---|
| 1201a | Relative Value of Total Purchases Over the Last Twelve Months | 1 | Monthly | Exponential | 18 | • • • |
| 1201b | Length of Time Since First Order, in Days | 1 | Monthly | Logarithmic | 18 | |
| 1201c | Corroborated Identity | 0.2 | Daily | Linear | 4 | |
| 1201d | Reviews Accepted | 1.5 | Daily | Linear | 26 | |
| 1201e | Uploaded Images Accepted | 1 | Daily | Linear | 18 | |
| 1201f | Other Supplied Content Accepted | 1 | Daily | Linear | 18 | |
| 1201g | Reviews Suppressed | -4 | Daily | Linear | -70 | |
| 1201h | Images Suppressed | -5 | Daily | Linear | -88 | |
| 1201i | Other Supplied Content Suppressed | -3 | Daily | Linear | -53 | |
| 1201j | Reputation Score From External Source AA | 1 | Daily | Linear | 10 | |
| 1201k | Reputation Score From External Source BB | .07 | Monthly | Linear | 10 | |
| | ⋮ | | | | | |

Example Assessed User Trust Information

| | 1320 | 1302a | 1302b | 1302c |
|---|---|---|---|---|
| 1310 | | Jane Doe | Fred Smith | Brenda Starr |
| 1301a | Relative Value of Total Purchases Over the Last Twelve Months | 4 | 9 | 1 |
| 1301b | Length of Time Since First Order, in Days | 5 | 10 | 2 |
| 1301c | Corroborated Identity | 0.8 | 0.8 | 0 |
| 1301d | Reviews Accepted | 2 | 15 | 5 |
| 1301e | Uploaded Images Accepted | 0 | 3 | 1 |
| 1301f | Other Supplied Content Accepted | 1 | 7 | 2 |
| 1301g | Reviews Suppressed | 0 | 0 | −50 |
| 1301h | Images Suppressed | 0 | 0 | −20 |
| 1301i | Other Supplied Content Suppressed | 0 | 0 | −10 |
| 1301j | Reputation Score From External Source AA | 8 | – | 6 |
| 1301k | Reputation Score From External Source BB | 7 | 30 | – |
| 1330 | Calculated Trust Score Total | 27.8 | 47.8 | −63 |

*FIG. 1B*

Example Content Quality Assessment Information

1400

| | Supplying User Scaling Factor (1402a) | Evaluating Users Usefulness Rating Scaling Factor (1402b) | Rating Quantity Threshold (1402c) | Supplying User Trust Score Suppression Threshold (1402d) | Evaluating User Trust Score Disregard Threshold (1402e) | ... |
|---|---|---|---|---|---|---|
| 1401 | 0.5 | 1 | 5 | -30 | -10 | |

FIG. 1C

Example Assessed Content Usefulness Information

1450

| | Content Piece ID (1452a) | Supplying User (1452b) | Jane Doe Usefulness Rating (1452c) | Fred Smith Usefulness Rating (1452d) | Brenda Starr Usefulness Rating (1452e) | User ABC Usefulness Rating (1452f) | User BCD Usefulness Rating (1452g) | User CDE Usefulness Rating (1452h) | | Assessed Usefulness Rating (1452z) |
|---|---|---|---|---|---|---|---|---|---|---|
| 1451a | 0001341 | User XYZ | -1 | 1 | -1 | 1 | -1 | 1 | ... | 19 |
| 1451b | 0001342 | Fred Smith | 1 | - | 1 | -1 | - | - | | 31.8 |
| 1451c | 0001343 | Brenda Starr | - | - | - | - | - | - | | -31.5 |
| 1451d | 0001344 | User CDE | 1 | 1 | - | -1 | - | - | | 3.6 |
| 1451e | 0001345 | Fred Smith | 1 | - | - | 1 | 1 | -1 | | 36.4 |
| | | ⋮ | | | | | | | | |

FIG. 1D

ASSESSING CONTENT BASED ON ASSESSED TRUST IN USERS

CROSS REFERENCE TO RELATED APPLICATIONS

This application is a continuation-in-part of co-pending U.S. patent application Ser. No. 10/646,341, filed Aug. 22, 2003 and entitled "Managing Content Based On Reputation," which is hereby incorporated by reference in its entirety, and is a continuation-in-part of co-pending U.S. patent application Ser. No. 11/165,842, filed Jun. 24, 2005 and entitled "Exchanging User Reputation Information," which is hereby incorporated by reference in its entirety and which is a continuation-in-part of U.S. patent application Ser. No. 10/646,341, filed Aug. 22, 2003 and entitled "Managing Content Based On Reputation" and of U.S. patent application Ser. No. 11/024,006, filed Dec. 27, 2004 and entitled "Using Corroborated User Identities To Enhance Information Credibility."

TECHNICAL FIELD

The following disclosure relates generally to techniques for using automatically assessed levels of trust for users to assist in automatically assessing and selecting user-supplied content.

BACKGROUND

As the Internet and other online access to information continues to grow, users are increasingly presented with an over-abundance of available information content without effective means to manage it (e.g., to identify content that is relevant, accurate and enjoyable). While some systems exist that attempt to locate content of a particular type and to rank available content as to relevance, such as some search engines, the techniques used by such systems have numerous problems. For example, even if a particular technique for ranking identified content was effective, a system using such a technique would still suffer from the difficulty in initially identifying that content as being potentially relevant so that it could be ranked. Moreover, as the number of available sources of content grows (e.g., content from numerous users that generate blogs (or "Web logs") that may each have multiple distinct blurbs of content that address disparate topics each day), the ability to timely identify and analyze such content further suffers.

One particular example of an increasing source of content relates to merchants that make items (e.g., products, services, information, etc.) available to customers for purchase, rent, lease, license, trade, evaluation, sampling, subscription, etc., such as via the World Wide Web ("the Web"). It is common for Web merchants to design their Web sites to display content in order to draw interest to items available from the Web site. As one example of such content, some Web merchants include item reviews and item pictures on their Web sites, such as to provide additional information about an item. While Web merchants may in some cases pay professionals to provide such content (e.g., professional reviewers and professional photographers), procuring such content can be expensive, and some users may dislike such professionally supplied content (e.g., readers of professional reviews may be distrustful of the evaluation from a professional reviewer).

In other cases, volunteer users of a Web site, such as customers of a merchant's Web site, are solicited to prepare and supply content such as item reviews or images. While such volunteer-supplied content has advantages over professionally supplied content in terms of cost and of appeal to some readers, volunteer programs often have significant disadvantages of their own. For example, much volunteer-supplied content may be of little use to other users (e.g., prospective, purchasers) for a variety of reasons, such as poor writing and/or analysis, poor image quality or product arrangement/placement within an image, the inclusion of irrelevant and/or inappropriate subject matter, opinions that differ greatly from those of most other users, etc.

BRIEF DESCRIPTION OF THE DRAWINGS

FIGS. 1A and 1B illustrate examples of trustworthiness factor information used for assessing trust scores for users and of assessed trust scores for content-supplying users, and FIGS. 1C and 1D illustrate examples of assessing pieces of content based in part on assessed trust scores for associated users.

DETAILED DESCRIPTION

Figure 2:
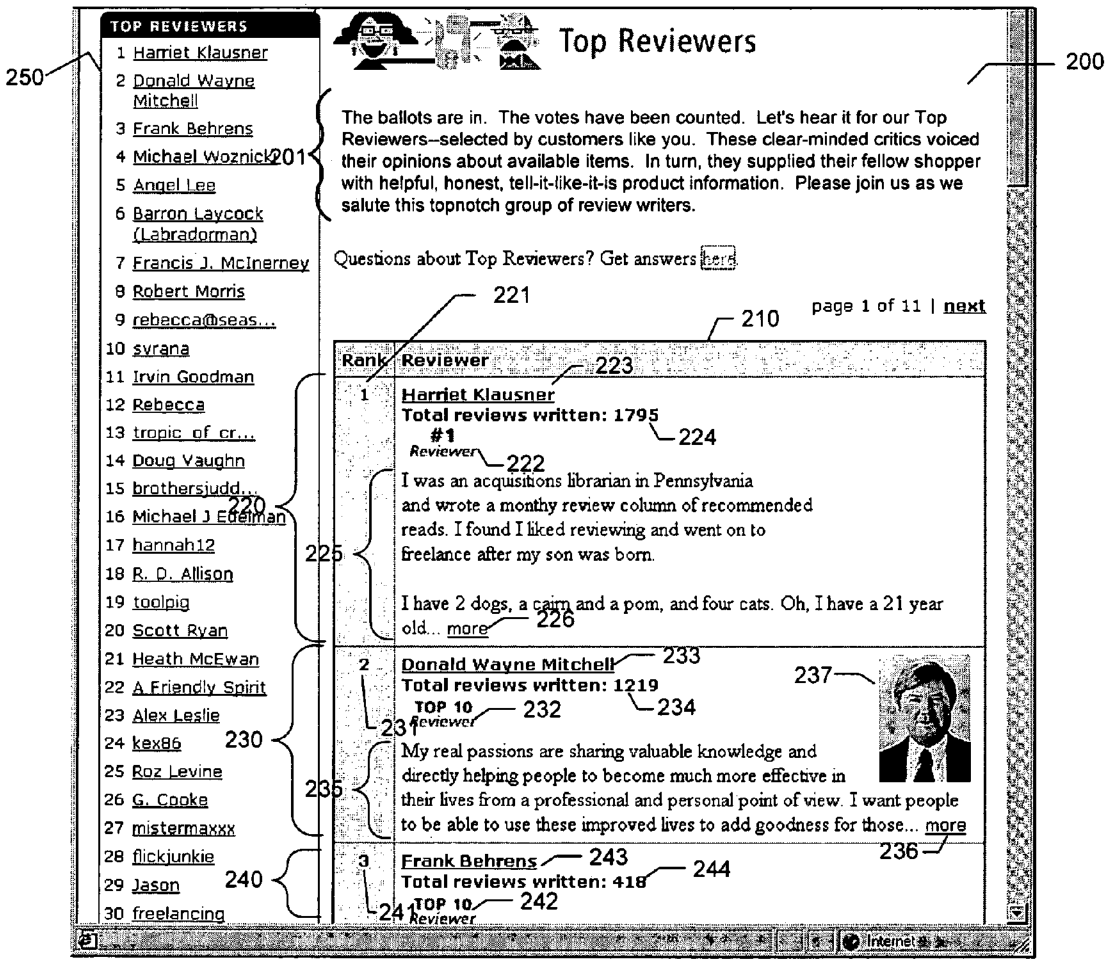
FIGS. 2-6 are display diagrams illustrating examples of displays for presenting and evaluating user-supplied content and for presenting information about top-ranked content-supplying users.

Techniques are described for managing content by identifying content that has attributes of interest (e.g., content that is useful, humorous and/or that has a sufficiently high degree of quality) and by determining how to use such identified content. In some embodiments, aspects of a piece of content are automatically assessed in a manner that is based on automatically assessed levels of trust in users who are associated with the piece of content, such as a user who authored or otherwise supplied the piece of content and/or one or more users who evaluated the piece of content. For example, in at least some embodiments an automatically assessed level of trust for a user is based on prior activities of the user and is used to predict future behavior of the user as a supplier of acceptable content and/or as an acceptable evaluator of supplied content.

As one example of using automatically assessed levels of trust in users to facilitate automatic assessment of an available piece of content, evaluations of the piece of content (e.g., votes on or other forms of rating of one or more attributes of the content) may be obtained from evaluator users and then given varying degrees of influence on the assessment of the content piece in a manner based on assessed levels of trust in those evaluator users (e.g., by weighting the evaluations of users with high levels of trust more strongly than the evaluations of users with lower levels of trust, or by ignoring the evaluations of users with lower levels of trust). Similarly, an available piece of content that is supplied by a user may be initially assessed in a manner based on an assessed level of trust in that user (e.g., to predict a likely degree of quality of the piece of content), and a determination may initially be made of whether and how to use the piece of content (e.g., whether to make the piece of content available to other users for evaluation and/or for other purposes) based on that initial assessment.

A piece of content being managed may have a variety of forms, such as, for example, an item review, a how-to guide, a blog or blog blurb (or other entry in or portion of a blog), another form of textual passage (e.g., a story, poem, etc.), a discussion board or message thread or an entry in such a board or thread, a list of related items or other type of list, a photo or other image, a video, a music sample or other audio clip, a user profile from a social networking site or other information related to social networking, etc. More generally, a piece of content to be evaluated and managed may in some embodiments be any information that has one or more attributes that can be evaluated by other users (e.g., information that includes one or more factual assertions or opinions, with the evaluations used to certify the accuracy and/or truthfulness of those assertions, or information that is to be evaluated based on one or more subjective standards, such as elegance or beauty). Moreover, in some embodiments the pieces of content may be user-supplied and/or be provided to a Web merchant (e.g., by customers of the merchant) for use by the merchant.

In at least some embodiments, levels of trust in users are automatically assessed in various ways before being used to facilitate automatic assessment of content. For example, in some embodiments such levels of trust are automatically assessed for users based on prior activities of the users and other information for the users, such as to calculate one or more trust scores for each of the users that reflect trust that has been earned and/or allocated based on such prior activities, or more generally to reflect various aspects of the users' reputations (e.g., one or more calculated reputation scores) based on prior activities and/or other types of information. In some embodiments, a variety of types of trustworthiness factors are identified that each may influence an assessed level of trust for a user, with the assessment of a trust level for a user including aggregating information for the trustworthiness factors that apply to the user. Furthermore, in some embodiments a level of trust may be assessed for a user based on prior activities and other information that are unrelated to an activity of the user with which the assessed level of trust is used, such as to use an assessed level of trust for a user to influence evaluations of content by the user and/or an initial assessment of content supplied by the user despite the prior activities and other information for the user being unrelated to activities involving supplying and/or evaluating content.

FIGS. 1A-1B illustrate examples of trustworthiness factor information used by a merchant for assessing trust scores for customer users and of assessed trust scores for some such customers. These examples are provided for illustrative purposes and are simplified for the sake of brevity, and the inventive techniques can be used in a wide variety of other situations, including with other types of trustworthiness factor information, by assessing trust in users in other manners, and by entities other than merchants.

In the illustrated example, FIG. 1A includes a table 1200 with examples of various trustworthiness factors 1202*a* for users, which in this example include the following: a relative value of total purchases by a user over a specified period of time (which in this example is 12 months) compared to other users 1201*a*, such as to give greater influence to user accounts that correspond to actual customers who actively make purchases; a length of time since a user's first order 1201*b*, such as to give greater influence to users that are long-time customers; and the existence of a corroborated identity 1201*c* for a user, such as to give greater influence to users who are not anonymous. Additional details regarding examples of corroborating a user's identity are included in U.S. patent application Ser. No. 11/024,006, filed Dec. 27, 2004 and entitled "Using Corroborated User Identities To Enhance Information Credibility," which is hereby incorporated by reference in its entirety. The example trustworthiness factors 1202*a* for a user further include several factors 1201*d*-1201*i* related to prior activities of the user in supplying content, such as to give positive influence to prior submissions of item reviews, images and other types of content (e.g., lists of items of interest, how-to guides and other descriptive submissions, etc.) that are accepted (e.g., based on having a sufficiently high assessed level of quality or other evaluation rating, such as an average usefulness rating of at least 3.5 if a positive usefulness vote equals 4 and a negative usefulness vote equals 2, or such as an average rating of at least 4 on a scale of 5) and to give negative influence to prior submissions of item reviews, images and other types of content that are suppressed or otherwise prevented from being further used (e.g., based on not having a sufficiently high assessed level of quality or other evaluation rating, such as not sufficiently high to be accepted). In addition, the example trustworthiness factors 1202*a* for a user further include examples 1201*j* and 1201*k* of reputation scores granted to the user by indicated external sources, such as other organizations unaffiliated with the merchant. Various other types of trustworthiness factors may similarly be tracked and used in other embodiments, including one or more reputation scores calculated by the merchant for a user (e.g., based on prior activities of a user in supplying content, such as to reflect how such previously supplied content was subsequently assessed, and/or based on prior activities of a user in evaluating content, such as to reflect how well the evaluations of the user agree with consensus evaluations of that content), and other types information about a user, possibly from external sources (e.g., financial information, such as credit scores). Additional details related to examples of such calculated reputation scores and of exchanging user-related and reputation-related information are included in co-pending U.S. patent application Ser. No. 10/646,341, filed Aug. 22, 2003 and entitled "Managing Content Based On Reputation," and in co-pending U.S. patent application Ser. No. 11/165,842, filed Jun. 24, 2005 and entitled "Exchanging User Reputation Information."

In addition to the trustworthiness factors 1202*a*, the example table 1200 also illustrates other types of information 1202*b*-1202*e* for use in assessing trust levels based on the trustworthiness factors. In particular, the other types of information in this example include a weight 1202*b* for each of the trustworthiness factors, a maximum value 1202*e* for each of the trustworthiness factors, and a type of transform 1202*d* between zero and the maximum value for each of the trustworthiness factors, such as for use in calculating trust scores for users as discussed further with respect to FIG. 1B. Thus, for example, the length of time factor 1201*b* is given a relative weight of 1 and a maximum value of 18, while the corroborated identity factor 1201*c* is given a relative weight of 0.2 and a maximum value of 4. The length of time factor 1201*b* will also use a logarithmic scale to select a value between 0 and 18 based on where a user's length of time value falls in a range from 0 days to a maximum possible number of days (e.g., the number of days since the merchant has had customers, or the largest current number of days that any user has been a customer of the merchant), while the corroborated identity factor 1201*c* will use a linear scale to select a value between 0 and 4 based on a user's identity corroboration (e.g., based on multiple degrees or levels of corroboration, based on a degree of completion of performing the corroboration, or instead by selecting 0 or 4 based on a binary determination of whether the identity corroboration is completed). The other information in this example further includes an update frequency 1202$c$ for each of the trustworthiness factors to indicate how often to update a user's value for that trustworthiness factor.

FIG. 1B illustrates examples of assessing trust scores for users based on the trustworthiness factor information illustrated in FIG. 1A. In particular, FIG. 1B illustrates an example table 1300 with example calculated trust scores 1330 for each of three example customer users 1302$a$-1302$c$ based on values for those users for the illustrated trustworthiness factors. In particular, in this example the value shown for a user for a trustworthiness factor represents the user's value for that factor after the value is adjusted based on the weight 1202$b$ for that factor, and the calculated trust score 1330 for a user is a summation of those trustworthiness factor values. For example, by summing the values in column 1302$a$ for user Jane Doe for each of the trustworthiness factors (those being 4, 5, 0.8, 2, 1, 0, 0, 0, 0, 8 and 7), a calculated trust score of 27.8 is obtained. In other embodiments, the values may be represented in other manners (e.g., the raw value for a trustworthiness factor before that value is weighted; underlying information from which the raw value can be calculated, such as the actual number of days that a user has been a customer for factor 1201$b$; etc.), and the calculated trust score may be generated in other manners (e.g., the resulting value may be scaled to fit within a specified range for trust scores, such as from −100 to 100, if the maximum values 1202$e$ and weights 1202$b$ are not selected to provide such a desired scaling). Also, while not illustrated here, in some embodiments a calculated trust score for a user may reflect only a limited number of trustworthiness factors (e.g., if only that limited number of factors are in use, or if the user has non-zero values for only that limited number of factors), such as one or more automatically calculated reputation scores for the user from the merchant (e.g., based on prior activities of the user in supplying content and/or in evaluating content).

In this example, the various user information may also be used to illustrate examples of different types of customers of the merchant. For example, user Jane Doe has a calculated trust score of 27.8 based on prior activities that indicate a relatively average level of purchase activity and history with the merchant, a relatively good reputation from external sources, a relatively low history of supplying acceptable content, and no history of supplying suppressed content—as such, Jane Doe may represent a fairly typical customer with an average or good trust score. User Fred Smith, whose information is shown in column 1302$b$, has a calculated trust score of 47.8 based on prior activities that indicate a relatively high level of purchase activity and history with the merchant, a relatively good history of supplying acceptable content with no history of supplying suppressed content, and a relatively mediocre reputation from external sources—as such, Fred Smith may represent a fairly valuable customer with a high trust score. User Brenda Starr, whose information is shown in column 1302$c$, has a calculated trust score of −63 based on prior activities that indicate a relatively low level of purchase activity and history with the merchant, a relatively poor history of supplying acceptable content and of supplying content that is not suppressed, and a relatively average reputation from external sources—as such, Brenda Starr may represent a fairly low value customer with a low trust score, in particular due to the past history of supplied content that has been suppressed. Due to the low trust level assessed for Brenda Starr, for example, some or all new content that is supplied by her may be automatically suppressed and not made available to other users, and evaluations of other content by her may be ignored or significantly discounted. For a new customer of the merchant for whom no information was available, not shown, the assessed trust score in this example would be zero. Also, for a customer of the merchant whose only trustworthiness factor information is based on an automatically calculated reputation score for the user from the merchant (e.g., based on prior activities of the user in supplying content and/or in evaluating content), not shown, the assessed trust score would be that automatically calculated reputation score, subject to any weighting and/or scaling applied to that calculated reputation score value. Moreover, in at least some embodiments various users may be automatically grouped or clustered based on assessed trust scores, whether alone or in combination with other information about the users (e.g., similarities in information supplied by the users and/or other similarities in opinions of the users)—if so, such groups or clusters of users may be used in various ways, such as to identify similar customers who should be treated similarly (e.g., to provide greater privileges or benefits to more highly valued customers), to more heavily weight information and/or input from users in the same group/cluster when assessing information to potentially be provided to a user, or for use in providing recommendations to users based on information related to other users of a common group/cluster. Moreover, a representative or model user could be created for each group/cluster, such as for use in providing recommendations to other users of the group.

As previously noted, several example trustworthiness factors are discussed with respect to FIGS. 1A and 1B. A non-exclusive list of trustworthiness factors that may be used by a merchant to assess customer users of the merchant include, for example, information about purchases from the merchant by the customer within a specified time period (e.g., a number, frequency, total value, etc. of the purchases); information about a length of time that the user has been a customer of the merchant; information about whether the customer has authenticated or otherwise corroborated information about the customer (e.g., an identity of the customer, specified attributes of the customer, etc.); information about other types of interactions of the user with the merchant (e.g., returns, complaints, requests for support, etc.); information about a level of trust granted to the customer by one or more other organizations (e.g., third-party organizations that are unaffiliated with the merchant, such as other merchants, social networking organizations, organizations that act to provide endorsements or other credible information about users and/or their abilities or attributes, etc.) and/or about interactions of the customer with the other organizations; information about other users associated with the customer (e.g., buddies or friends, such as from one or more social networking organizations); information about prior activities of the customer in supplying content and/or in evaluating content; information about prior assessments of or actions taken for content supplied by and/or evaluated by the customer (e.g., if content supplied by a user is subsequently suppressed due to poor evaluations); information about other status or activities of a user (e.g., financial information, such as a credit score, whether the user rents or owns a home, etc.), etc. Moreover, in at least some embodiments the trustworthiness factors used for evaluating at least some users may be extensible and/or configurable by users (whether the same users or other users), such as to allow a user to have at least some control on what factors should be used and how those factors should be used when assessing trust scores for other users whose evaluations will affect the pieces of content provided to the user. For example, a user may be allowed to enhance or diminish the weight given to various other users when assessing content to potentially be provided to the user, such as based on demographic information about the other users, on membership in a common or specified group/cluster, on specific identified trustworthiness factors, etc.

FIGS. 1C and 1D illustrate examples of assessing pieces of content based in part on assessed trust scores for associated users, and in particular in this example to assess the quality of a piece of content based on the assessed usefulness of the content piece to users to whom it is presented or otherwise provided. These examples are provided for illustrative purposes and are simplified for the sake of brevity, and the inventive techniques can be used in a wide variety of other situations, including with other types of content, other types of assessed user trust information, by assessing content in other manners, and by entities other than merchants.

In the illustrated example, FIG. 1D includes a table 1450 with examples of various pieces of content 1451*a*-1451*e* that have each been supplied to the merchant by a user, and whose quality is being automatically assessed. In particular, each piece of content has a unique identifier 1452*a*, an indication of a supplying user 1452*b*, an assessed content quality usefulness rating 1452*z*, and usefulness ratings 1452*c*-1452*h* from various users (some not shown) who have evaluated the piece of content. In this example, the usefulness ratings 1452*c*-1452*h* are a binary rating of useful (represented by the value of "1") or not useful (represented by the value of "−1"), although in other embodiments the usefulness ratings 1452*c*-1452*h* may instead have multiple possible values, and each piece of content may further be assessed for each of multiple quality-related or other aspects.

In this example, the assessment on a piece of content is based on assessed trust scores for users associated with the content piece, such as the user who supplied the content piece and any users who evaluated the content piece. In particular, the assessment in this example uses the following equation, $$ACQ(C) = ATS(SU_C) * \text{SU\_SF} + \sum_{i=1-NE} (ATS(EU_i) * UR(EU_i, C)) * \text{EU\_SF} / \max(RQT, NE),$$

with ACQ being an assessed content quality usefulness rating score for a piece of content C, $SU_C$ being the supplying user for the piece of content C, $EU_i$ being a current one of a number NE of evaluating users who each provide a usefulness rating UR for the piece of content, ATS being an assessed trust score for the indicated user, SU_SF being a scaling factor for adjusting a supplying user's assessed trust score, EU_SF being a scaling factor for adjusting the result of multiplying an evaluating user's assessed trust score by the content usefulness rating from that user, and the max(RQT,NE) term being a normalizing factor for the aggregated content ratings of the evaluating users such that a larger of a rating quantity threshold and the number NE of evaluations is used, although in other embodiments the number of user viewings of the piece of content may be used rather than the number of evaluations. As discussed in greater detail elsewhere, in some embodiments one or more other related assessment equations are instead used (e.g., equations with additional terms that consider additional types of information), but in this example embodiment this example equation is used for the purposes of clarity.

In this example, a table 1400 includes example values 1401 for the scaling factors and rating quantity threshold 1402*a*-1402*c*, although in other embodiments these values may change to reflect a scale of a typical merchant and/or for other reasons (e.g., to use a rating quantity threshold of 200 rather than 5), and the calculation of one or more content quality scores for a piece of content may be performed in other manners, as discussed in greater detail elsewhere. The table 1400 also includes example values for thresholds to use for determining when to suppress content from a supplying user (in this example, when the supplying user's assessed trust score is lower than −30, as indicated in column 1402*d*) and when to ignore an evaluation from an evaluating user (in this example, when the evaluating user's assessed trust score is lower than −10, as indicated in column 1402*e*), although in other examples one or both of these thresholds may not be used or may have different values.

For example, content piece 1451*c* is supplied by user Brenda Starr, whose assessed trust score from FIG. 1B is −63. Since this value is below the threshold of −30 for suppressing content, this piece of content is not made available to others and has no evaluations. Thus, the assessed content quality value for this piece of content is Brenda Starr's assessed trust score of −63 multiplied by the supplying user's scaling factor of 0.5, resulting in a value of −31.5. In addition, in this example Brenda Starr has provided evaluations of content pieces supplied by others, as shown in column 1452*e*, but those ratings are currently disregarded while her assessed trust score is below the disregard threshold of −10 (as illustrated for the sake of convenience by displaying those rating values in italics). Similarly, the evaluations from User CDE in column 1452*h*, who currently has an assessed trust score of −15 in this example (not shown), will be disregarded in this example.

As another example, content piece 1451*a* is supplied by User XYZ and has four evaluations that will be used for the content quality assessment (as shown in columns 1452*c*, 1452*d*, 1452*f* and 1452*g*), with a resulting assessed content quality score of 19. In particular, User XYZ's assessed trust score of 20 (not shown) provides 10 points to the content quality score after being adjusted by the supplying user scaling factor of 0.5, and the evaluating users' evaluations provide an additional 9 points to the content quality score. Thus, despite having an equal number of useful and non-useful votes, the relatively high assessed trust scores of users Fred Smith and User ABC (those being 47.8 and 20, respectively, not shown) cause their votes to have a greater overall influence (by 7 points) than those of users Jane Doe and User BCD (whose assessed trust scores are 27.8 and −5, respectively, not shown), as shown by the calculation of (27.8*−1+47.8*1+20*1+−5*−1)*⅕=(45)*⅕=9. Content piece 1451*b* from user Fred Smith has an assessed content quality score of 31.8 (based on 20 evaluations used, 18 of which are not shown and which add 150 for the $\Sigma(ATS(EU_i)*UR(EU_i,C))$ summation term), content piece 1451*d* from User CDE has a slightly positive assessed content quality score of 3.6 (based on the three evaluations shown offsetting User CDE's negative assessed trust score of −15), and content piece 1451*e* from user Fred Smith has an assessed content quality score of 36.4 (based on 100 evaluations used, 97 of which are not shown and which add 1200 for the $\Sigma(ATS(EU_i)*UR(EU_i,C))$ summation term).

Thus, for these 5 example pieces of content provided to a merchant by various users, content pieces 1451*e* and 1451*b* may be most prominently featured by the merchant (e.g., by being presented or otherwise provided most often and/or most prominently to other users, such as at the top of a list or ordering of multiple pieces of content) due to their relatively high content quality scores, content pieces 1451*a* and 1451*d* may be used but less prominently due to their relatively moderate content quality scores, and content piece 1451*c* will be suppressed and not used. For example, the example pieces of content 1451*a*-1451*d* may each be an item review for a particular item available from the merchant, and when a customer requests information regarding the item, one or more of these item reviews may be provided to the customer along with other information about the item—if so, the customer is more likely to be presented with the highest-rated piece of content 1451*b* and for that item review to be displayed prominently if multiple of the item reviews are included (e.g., by being at or near the top of the item reviews).

Figure 4:
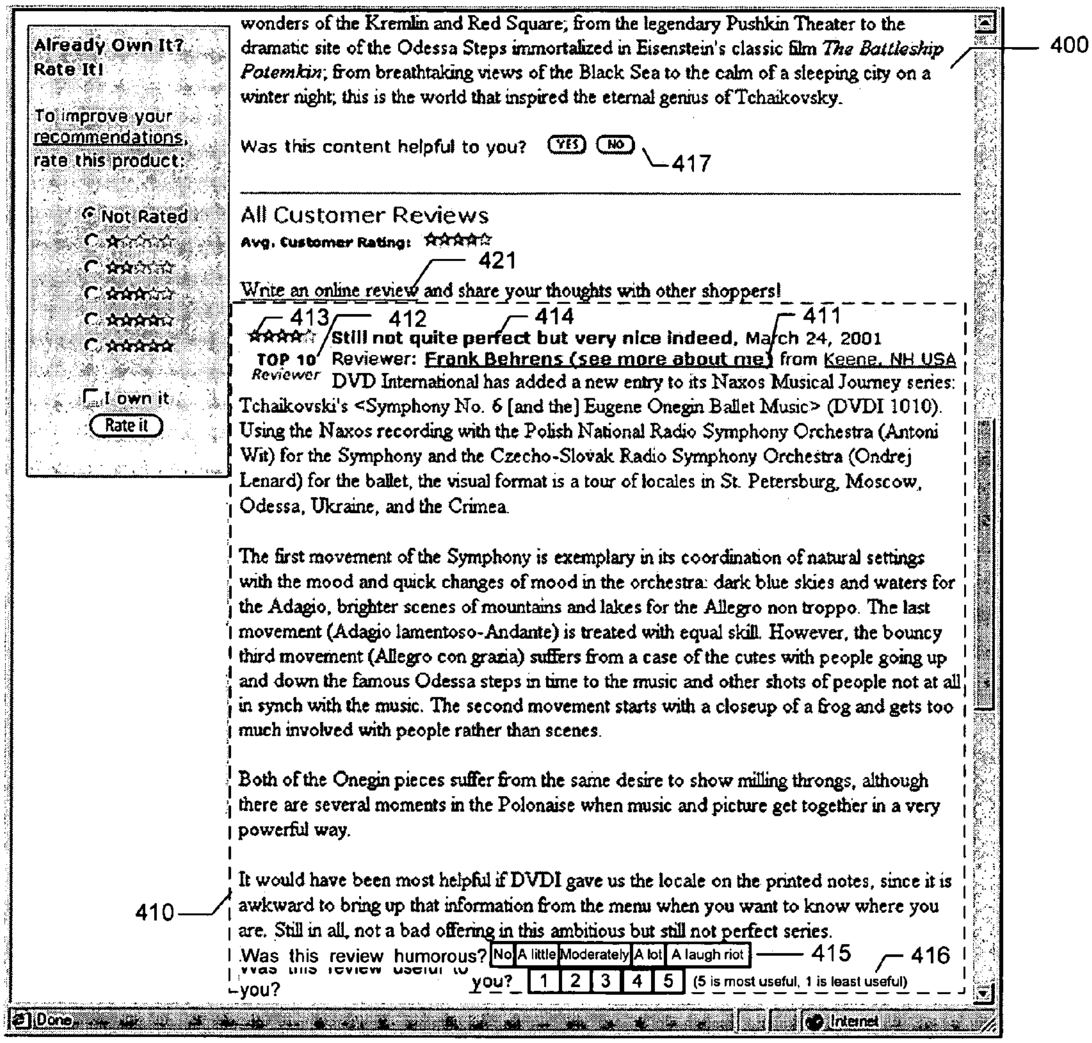
Figure 5:
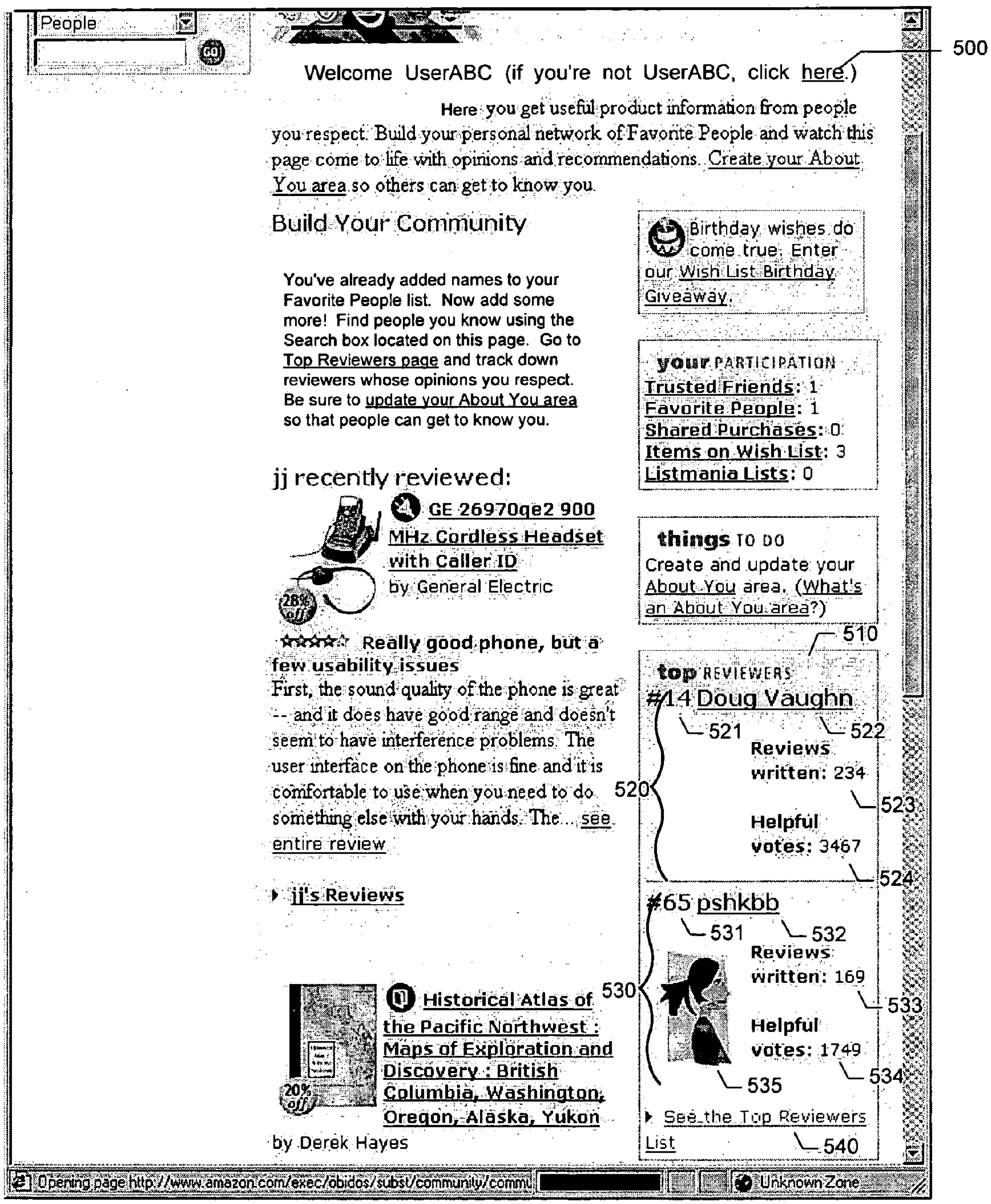
Figure 6:
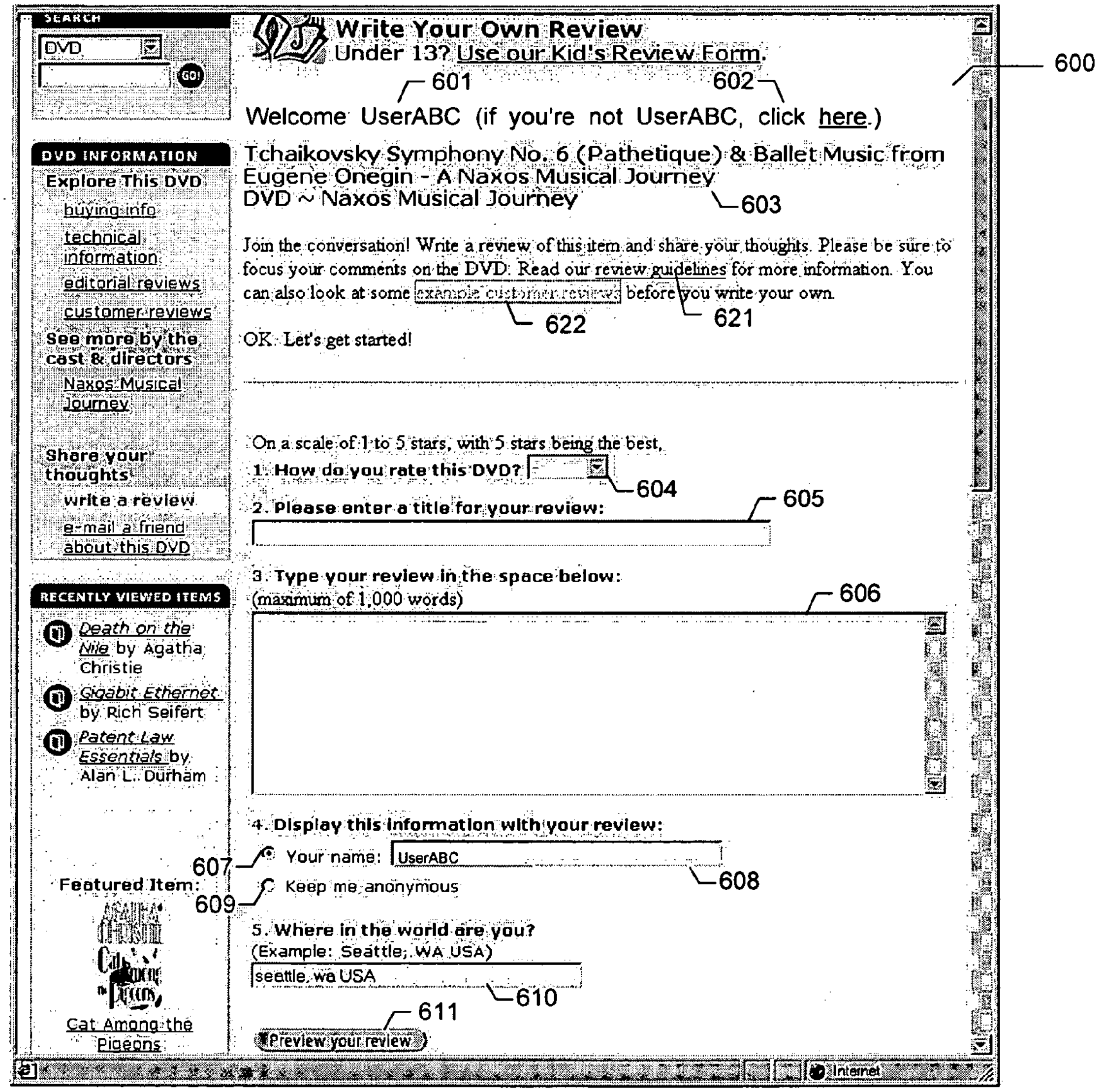

FIGS. 2-6 illustrate examples of displays for presenting and evaluating user-supplied content and for presenting information about top-ranked content-supplying users, such as for use with the example pieces of content 1451*a*-1451*e*. In particular, FIGS. 2-5 show examples of ways in which information about top-ranked content-supplying users (in this example being "reviewers" who are supplying item review content) can be provided to users of a Web site, with analogous information about evaluating users similarly able to be provided (although not shown here for the sake of brevity). FIG. 6 illustrates an example display that enables a content-supplying author user to submit a new item review piece of content, with analogous information to allow evaluating users to submit evaluations similarly able to be provided (although not shown here for the sake of brevity).

Figure 3:
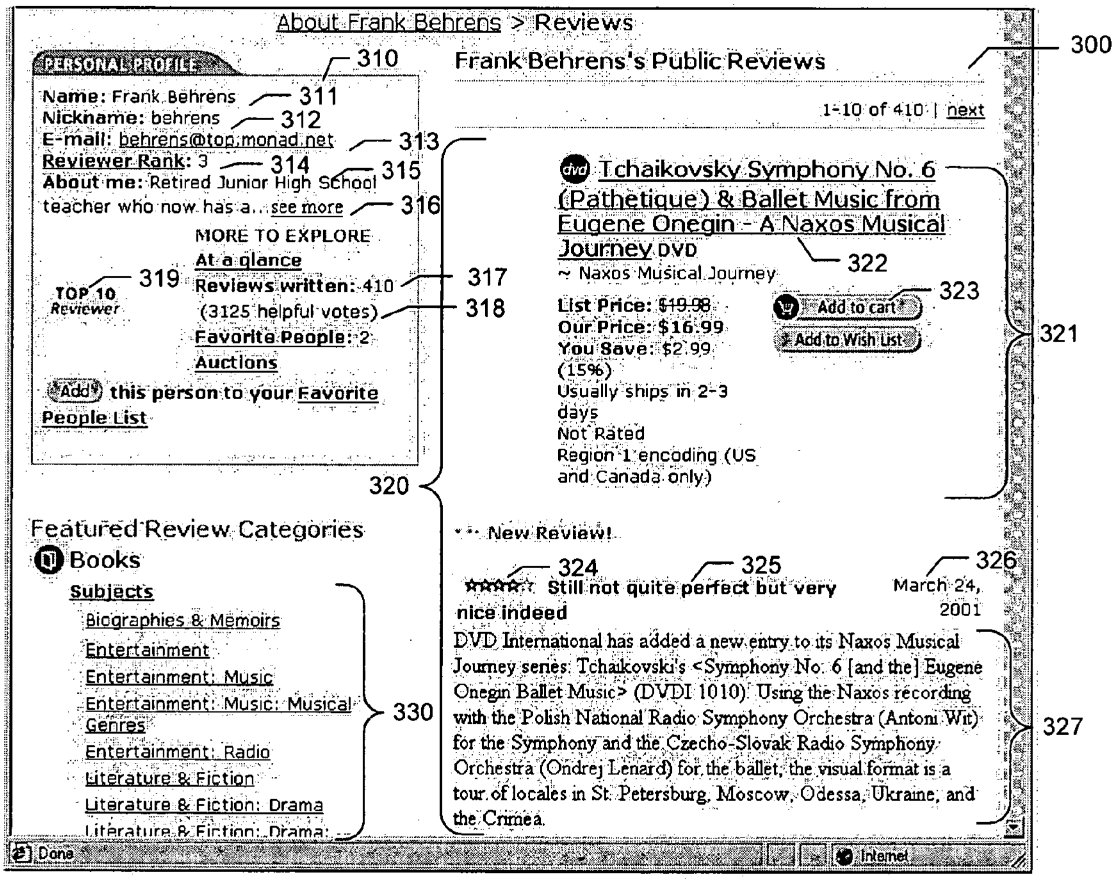

In particular, FIG. 3 is a display diagram illustrating an example of a display 300 that provides information about a particular top-ranked reviewer user and an example of an item review piece of content 327 that is authored by the user, with analogous information about a particular top-ranked evaluator similarly able to be provided (although not shown here for the sake of brevity). This example display is displayed as part of an example Web site of an example Web merchant, and contains various information 320 about the review 327, such as information 321 about the item being reviewed (e.g., the title, artist, format, price, and availability of the item), a link 322 that may be used to display more information about the item, and a control 323 that may be used to initiate the placement of an order for the item. The information 320 also includes a rating or grade 324 assigned by the reviewer to the item as part of the review—here the grade shown is four stars out of five stars, and the review's title 325 and date on which the review was submitted 326 are also displayed. The illustrated display also contains more general information about reviews submitted by the reviewer, including a section 330 that illustrates item categories for which the reviewer has submitted reviews.

In this example, the display 300 further includes a profile 310 for the reviewer, with such information as the reviewer's name 311, a nickname 312 for the reviewer, an email address 313 for the reviewer, the current rank 314 of the reviewer, the beginning of a biographical sketch 315 of the reviewer, a link 316 to the entire biographical sketch of the reviewer, a count 317 of the number of reviews submitted by this reviewer, a count 318 of one type of reputation ranking assessment for the reviewer (in this case, the number of positive rating votes cast for the reviews of this reviewer by evaluators), and a graphical badge indication 319 related to the rank of the reviewer—in other embodiments, some or all of this information may instead be presented in other formats or instead not be available. In addition, while not illustrated here, in some embodiments one or more assessed trust scores for the reviewer may be displayed, while in other embodiments such information may be used only for internal purposes by the merchant (e.g., as part of determining a reviewer's rank) and not made directly available to the reviewer user and/or to other users.

FIG. 4 is a display diagram illustrating an example of a display 400 that provides detailed information about an available item along with item review content regarding the item. In this example, the item is the Tchaikovsky Symphony No. 6 DVD whose review is shown in FIG. 3, and the display 400 illustrates a portion of a Web page provided to a customer with information about the item (e.g., in response to the selection of link 322 shown in FIG. 3, or otherwise as requested by the customer). In addition to other information about the item, the display includes a list of one or more item review pieces of content submitted for the item by review authors, including review 410 submitted by reviewer Frank Behrens. In this example, the display of the review 410 includes the reviewer's name 411 (which in this example is a link to the display shown in FIG. 3); a graphical badge 412 related to the current rank of the reviewer; the item rating or grade 413 assigned to the item as part of the review; the review title 414; and the textual item review piece of content.

In addition, in embodiments in which this display is provided to a user other than Frank Behrens who has not yet evaluated this Behrens review of the item, the display may further include review evaluation rating selections to allow the user to act as an evaluator and provide an evaluation for the review. In this example, two evaluation rating selections 415 and 416 are displayed to allow the user to specify a quantitative rating (or "vote" or "assessment") of the content for each of two rating dimensions, which in the illustrated example are humor and usefulness. Other rating dimensions may instead allow quantitative ratings in a binary manner (e.g., via "yes" and "no" votes, such as in rating selection 417 for a prior item review shown for the item), in a non-quantitative manner (e.g., by gathering textual comments about the review), in a manner relative to other evaluations (e.g., this is the most informative of all the current evaluations for this content, or of all the evaluations by this evaluator, or of all the evaluations for any content), etc. The display further includes a link 421 that solicits the user to author his or her own review of the Tchaikovsky Symphony No. 6 DVD item, such as when the user has not yet provided a review for the item, as discussed further with respect to FIG. 6. In some embodiments, a decision of whether to provide one or more such review evaluation rating selections to a user may further be based at least in part on various information about the user, such as to not provide such review evaluation rating selection options to users with low assessed trust scores, or to provide additional incentives (e.g., rewards) to users with high assessed trust scores if they do provide such review evaluation rating selections.

FIG. 6 is a display diagram illustrating an example of a display that enables an author user to submit a new review piece of content, with analogous information to allow evaluators to submit evaluations similarly able to be provided (although not shown here for the sake of brevity). The user typically receives this display in conjunction with a particular item, for which the user can submit a review, although in other situations users could submit information not specific to an item (e.g., a blurb for a personal blog of the user). In this example, display 600 is provided in response to the user's selection of link 421 in the display containing detailed information about the Tchaikovsky Symphony No. 6 DVD shown in FIG. 4. The display includes the identity of the user 601, which is attributed as the identity of the reviewer. To attribute a different identity to the reviewer, the user can select link 602. The display also includes information 603 identifying the item to be reviewed, a control 604 used by the user to specify a grade or rating for the reviewed item, a field 605 for entering a title for the review, and a field 606 for entering the text of the review. In this example, the user may select radio button 607 in order to display a reviewer name with the review, which may be edited in field 608. Alternatively, the user may select radio button 609 to make the review anonymous (which in some embodiments may cause any rating of the review to not affect the author's reputation, while in other embodiments will not affect such use of ratings of the review). The display also includes field 610 for entering the author's location, although in embodiments in which the user has previously corroborated his/her identity, information such as that in fields 608 and/or 610 may not be displayed or modifiable. Before preparing the review as described, the user may also select link 621 in order to display guidelines for preparing the review and/or may select link 622 in order to display one or more example customer reviews demonstrating compliance with the review guidelines. When the user has assembled the review to be submitted, the user selects button 611.

FIG. 5 is a display diagram illustrating an example of a display 500 that provides information about two randomly-selected top-ranked reviewers as part of a portion of a Web page related to other types of information, with analogous information about top-ranked evaluators similarly able to be provided (although not shown here for the sake of brevity). The display 500 includes a list 510 of randomly-selected top-ranking reviewers, which can be comprised of one or more entries, and in this illustrated embodiment includes entries 520 and 530 related to two randomly-selected top-ranked reviewers. The display also includes a link 540 to the top reviewer's list shown in FIG. 2, which is a display diagram illustrating an example of a display 200 that shows a list of top-ranked reviewers. This example display includes language 201 congratulating the top-ranked reviewers and an ordered list 210 of the top-ranked reviewers. List 210 is comprised of ordered entries, each corresponding to one top-ranked reviewer, such as entries 220, 230, and 240. As an example, entry 220 contains information about the highest-ranked reviewer, Harriet Klausner. This entry contains the reviewer's rank 221, as well as a graphical badge 222 indicating the rank. The entry further contains the name of the reviewer 223, which is a link that the user can select in order to view more detailed information about this reviewer, as well as an indication 224 of the total number of reviews authored by this reviewer. The entry also contains further information 225 about the reviewer, which is typically provided by the reviewer. The information in this example includes a link 226 that may be selected by the user to display additional information about the reviewer. Some entries also contain an image of the reviewer, such as image 237 shown in entry 230. In addition to the list 210 of detailed entries about the top-ranked reviewers, the display also contains a more abbreviated list 250 of the top-ranked reviewers. In this list, each entry is merely the rank value and the name of the reviewer, which is a link that may be selected by the user to display additional information about the reviewer. Such information about top-ranked reviewers, and analogous information about top-ranked evaluators, can similarly be provided in a variety of other ways.

While the examples discussed above with respect to FIGS. 1A-1D and 2-6 have included a number of simplifying assumptions for the sake of clarity, in other embodiments a variety of additional types of information and techniques may be used as part of automatically assessing pieces of content and automatically assessing trust scores of users. For example, in the examples discussed above, each user was assessed a single trust score that was used on behalf of the user in various ways. In other embodiments, each user may instead have multiple such assessed trust scores that may be used in different manners, such as to reflect different types of activities of the user that are used as part of the assessment (e.g., to reflect a role of the user, such as when acting as a content supplier, evaluator, etc.) and/or different types of pieces of content that the user may supply and/or evaluate (e.g., content of different forms, such as item reviews versus photos; content with different types of subject matter, such as item reviews or other supplied content for books versus item reviews or other supplied content for electronics; etc.).

Moreover, in some embodiments the various users may be clustered into multiple user groups in various manners (e.g., based on similarities in their activities, opinions, demographic information, shopping activities, assessed trust scores, etc.), and each user may further be assessed one or more trust scores for each of the user groups (e.g., to reflect that the other users in the group to which a user belongs consider the content supplied by the user to be highly useful, while users in other groups do not consider the user's supplied content to be useful). Alternatively, in some embodiments information from a user (e.g., supplied pieces of content and/or evaluations) may only be used with respect to other users in the same group, such as to be provided to them and to receive evaluations from them. Such groups of users may be determined in various ways, including in an automated manner using one or more clustering algorithms (e.g., a k-means cluster analysis), as discussed in greater detail elsewhere. In at least some such embodiments, each user may be assigned to a single user group, while in other embodiments a user may be part of multiple user groups (e.g., different groups for different roles or other activities of the user).

In a similar manner, in some embodiments each piece of content may have multiple assessed content quality scores that not only reflect different attributes (or aspects or qualities or properties) of the content piece (e.g., helpfulness or more generally usefulness, informativeness, inappropriateness, accuracy, being spam, humorousness, etc.), but that further reflect different user groups. Thus, for example, a piece of content may have an assessed usefulness score for a first group of users that is high, and have other assessed usefulness scores for other groups of users that are low (e.g., to reflect different opinions or perspectives of users in different groups; to reflect different capabilities or knowledge of users in different groups, such as to be highly useful to a group of users with a high degree of specific technical knowledge but to be of little use to users without that technical knowledge; etc.). In order to assess the different scores for different groups of users, in some embodiments only evaluations from other users in the group will be used, or evaluations from users in other groups may be discounted. In addition, in at least some embodiments scores for different groups of users may be assessed in different manners, such as based on input received from users in those groups or on other information specific to the group. Furthermore, in embodiments in which users may each have multiple assessed trust scores, different assessed trust scores of a user may be used when assessing scores for different groups of users, such as to use an assessed trust score specific to a group of users. In addition, in some embodiments other information specific to a user may further be used to influence content submissions and/or evaluations from that user, such as an indication of a degree of authority of a user (e.g., to give increased influence based on credentials or recognition in a particular area), other relationships of the user with respect to the merchant (e.g., to give increased influence to a best-selling author of books, at least with respect to submissions and/or evaluations of related material), a relationship of the user with respect to a recipient user who may be provided with content (e.g., to give increased influence to evaluations from users on a buddy list of the recipient user when assessing a content quality score for a piece of content to potentially be provided to the recipient user, such as on a per-recipient user basis, or to give increased influence to evaluations from users who are in a same user cluster or user group as the recipient user).

In some embodiments, users each may further be provided with information that is specific to that user, such as based at least in part on a user group to which that user belongs and/or based on other user characteristics or user-specific information. For example, if content pieces are assessed with different ratings for different user groups, users of a particular group may only be provided with access to content that is sufficiently highly rated for that group, even if other content was highly rated for other groups. Alternatively, all content pieces may instead be available to users of the particular group, but the content ratings specific to that group may be used to influence when and how pieces of content are provided to the users (e.g., in an evolutionary display lifecycle to allow the most highly rated content to be identified and used, such as to primarily show highly rated content, but to also show at least occasional indications of new content to allow evaluations to be received for it and to show at least occasional indications of lower-rated content (such as randomly) to allow subsequent evaluations to raise the ratings if the prior ratings were not reflective of the actual eventual ratings for the content).

In addition, in at least some embodiments a variety of additional criteria are used when assessing content quality scores for a piece of content, such as to use additional scaling factors, to account for the number of evaluations received for or other "impressions" of displaying the piece of content in various ways, and to use multiple types of user ratings of the piece of content, as discussed in greater detail below. More generally, in some embodiments a variety of other types of factors may be considered as part of assessment of quality of a piece of content, such as activities of the supplier of the content piece to update or otherwise maintain the content piece, a relationship of the piece of content to a corresponding item (e.g., an item being reviewed or described), ways in which users use the piece of content (e.g., sending to other users, adding to favorites lists or watch lists for changes, etc.), etc.

As noted above, in some embodiments the described techniques are used by Web merchants and others to enhance the usefulness of content provided to users (also referred to as "surfacing" the content) for items available from their Web sites or otherwise available. In other embodiments, the described techniques may be used in other ways, such as by an entity providing the techniques to external third-parties (e.g., as a Web service to customers for a fee, such as merchant customers). In addition, in some embodiments various of the calculated and otherwise assessed information (e.g., assessed trust scores, assessed content quality values, etc.) and/or other types of related data (e.g., data available for use in doing the assessing, such as evaluations provided by evaluators and/or information about activities of users) may be provided to external third parties, such as to allow a user to export their assessed trust scores to Web sites of others in order to receive benefits from those others that are commensurate with those scores, or to allow the other Web site to better customize their Web site to the users. Similarly, in some embodiments various types of related information could be received from one or more third parties (e.g., trust scores for content supplier users and/or evaluator users that were calculated by the third parties, or instead other types of related data available from the third parties, such as data that can be used when doing the assessment of trust scores), and then used in assessing the trust scores of content-supplying users and/or evaluator users (or other types of users). Such exchange of assessment-related information to and/or from one or more systems performing assessments may in some embodiments be performed for a fee or other compensation, whether to the system (s) from the third party or instead from the system(s) to the third party.

For illustrative purposes, some embodiments are described below in which specific types of content are provided by content-supplying users (also referred to as "content providers") and in which specific types of evaluations of the content are provided by other users. In addition, a variety of details are discussed below regarding specific techniques for calculating specific types of trustworthiness factors for various types of users, and for using them in specific ways to provide benefits to requesters of content (e.g., other users, shoppers, etc.). However, it will be appreciated that the inventive techniques are not limited to these details and can be used in a wide variety of other situations, such as to determine and track reputations of or other forms of trust in other types of individuals and/or companies (e.g., suppliers, manufacturers, partners, vendors, affiliates, employees, customers, etc.) that provide information/content or otherwise perform interactions or activities that can be evaluated, and to perform such activities for other types of reasons (e.g., to assist others who may desire to evaluate users, such as for purposes of providing loans or credit or when assessing an individual on a dating or other social networking site; to evaluate users at least in part on their interactions with other users, such as based on assessed trust scores of those other users; to assess truthfulness and trustworthiness of individuals and the information that they produce or provide, such as for politicians; etc.).

Figure 7:
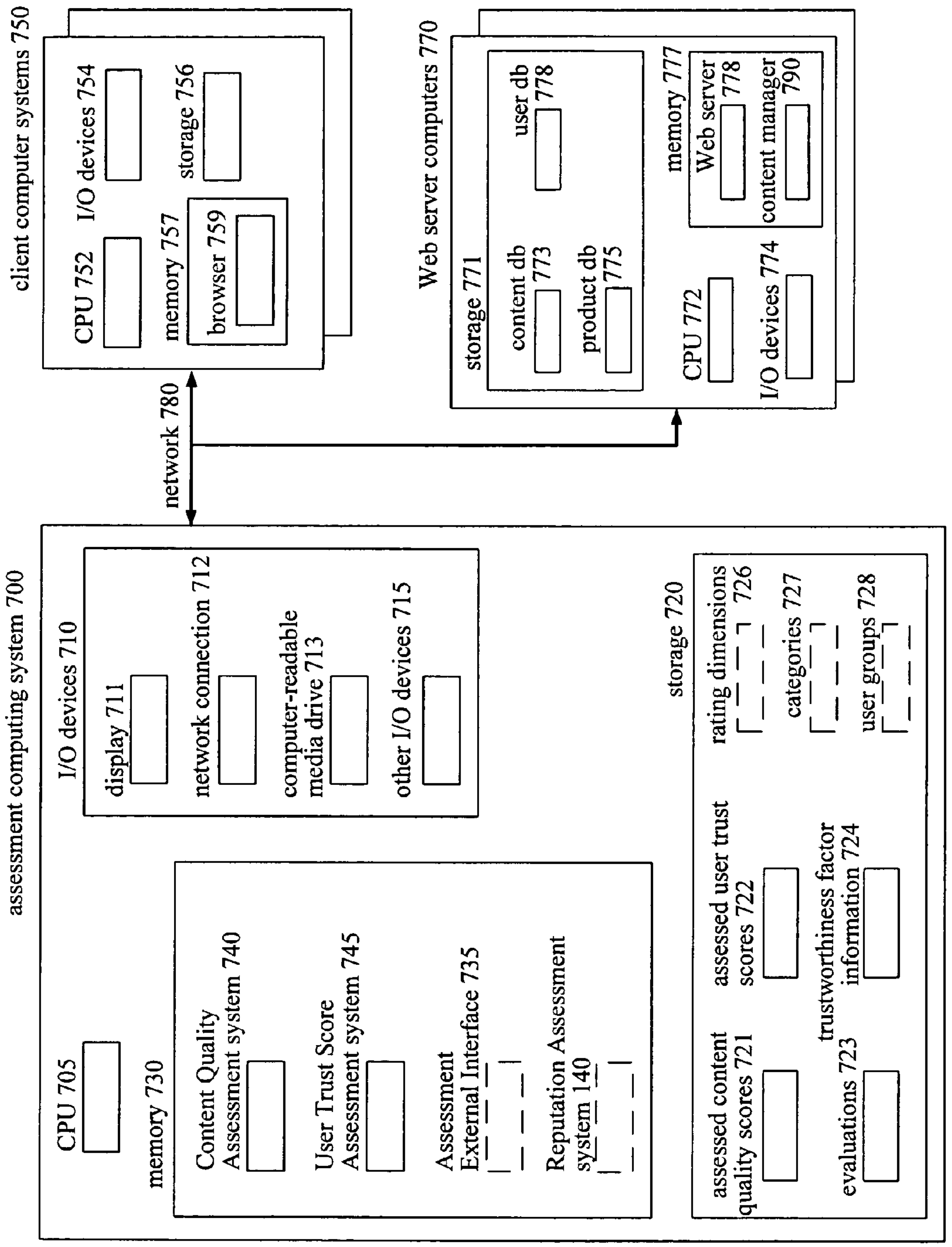
FIG. 7 is a block diagram illustrating an embodiment of a computing system for performing techniques to automatically assess levels of trust for users and to automatically assess pieces of content.

FIG. 7 illustrates an example assessment server computing system 700 suitable for assessing content quality and for assessing trust scores for users, as well as Web server computing system(s) 770 that can use assessed information when selecting content to provide to users of client computing systems 750. The assessment computing system 700 includes a CPU 705, various I/O devices 710, storage 720, and memory 730, with the I/O devices illustrated in this example embodiment including a display 711, a network connection 712, a computer-readable media drive 713, and various other I/O devices 715.

Embodiments of a Content Quality Assessment ("CQA") system 740 and a User Trust Score Assessment ("UTSA") system are each executing in memory 730 in this example, although in other embodiments the systems may execute on distinct machines or a single system may provide functionality of both the systems. The CQA system assesses quality scores for various pieces of content based in part on assessed trust scores for users associated with the content pieces (e.g., users who supply and/or evaluate the content pieces), and the UTSA system assesses the trust scores for various users based in part on prior activities of the users (e.g., on prior activities that are not directly related to supplying and/or evaluating pieces of content). In addition, in this example the CQA and UTSA systems execute in coordination with one or more server computing systems 170 (e.g., electronic marketplace systems executed by one or more Web merchants), although in other embodiments one or both of the CQA and UTSA systems may instead be incorporated within an electronic marketplace system 170.

In addition, an optional Assessment External Interface component 735 is executing in memory 730 in this example in order to provide assessments and/or assessment-related information to other systems (not shown) and/or to receive assessments and/or assessment-related information from other systems (not shown), such as to share or import/export assessment-related information, and an optional Reputation Assessment system 140 is executing in memory 730 in this example in order to generate reputation assessments (e.g., scores) for users when acting as authors or other suppliers of pieces of content and/or when acting as evaluators of pieces of content based in part on prior activities of the users involving supplying and/or evaluating content pieces. In other embodiments, one or both of the Assessment External Interface component 735 and the Reputation Assessment system 140 may not be used, or may instead be incorporated as part of the CQA system and/or the UTSA system.

In this example, the UTSA system receives indications of one or more users for whom trust scores are to be assessed, such as from a merchant or other entity executing one of the computing systems 170 that has user information 778 stored on storage 771, and assesses one or more trust scores for each of the users if possible. In particular, the UTSA system in this example obtains values for one or more trustworthiness factors for the users, such as by retrieving available values from trustworthiness factor information 724 on storage 720 and/or by calculating such values based on information about prior activities of the users (e.g., information provided by a merchant or other entity who indicated the users, such as from a user database ("db") data structure 778). The UTSA system then generates or updates one or more trust scores for each of the users based on the trustworthiness factor values, such as by combining the values in a manner that is weighted based on the trustworthiness factors, and stores the assessed trust scores with information 722 on storage 720. The UTSA system may further provide indications of some or all of the assessed trust scores to the merchant or other entity executing one of the computing systems 170 who indicated the users, such as to be stored in the user db 778 and to be used by a content manager system 790 executing in memory 777 of the computing system 170 in order to influence interactions with the users.

In some embodiments, the UTSA system may assess trust scores at times and/or in manners other than upon request, such as periodically or when additional trustworthiness factor information becomes available. In addition, in some embodiments the UTSA system may further assign default trust scores (e.g., a score of zero) to new users or others who do not have sufficient trustworthiness factor information, and only assess additional trust scores when sufficient trustworthiness factor information is available. Furthermore, in some embodiments the UTSA system may further assess multiple trust scores for each of at least some of the users, such as to reflect different activities of the users, to reflect different types of content with which the trust scores will be used, to reflect different user groups to which the users belong, etc. In this example, information 727 about multiple item and/or content categories and information 728 about multiple user groups is available on storage 720, such as from one or more merchants or instead as determined by the UTSA and/or CQA systems (e.g., based on automated clustering of users, items and/or content), and may be used by the UTSA system as part of the assessment of multiple trust scores. Clustering of users may be performed, for example, so as to define different market segments of customers of a merchant, and may utilize a variety of types of data such as content evaluations, authored or otherwise supplied content, indicated preferences and other user information (e.g., survey responses), etc. In addition, when the UTSA system assesses multiple trust scores for a user, the system may in some embodiments further assess a single overall trust score for the user, such as by combining the other assessed trust scores in a manner that is weighted based on the types of the other scores.

In this example embodiment, the CQA system receives indications of one or more pieces of content for which one or more quality-related scores are to assessed, such as from a merchant or other entity executing one of the computing systems 170 that has content information 773 stored on storage 771, and assesses one or more such quality-related scores for each of the content pieces if possible. In particular, the CQA system in this example obtains indications of one or more users associated with a piece of content, such as by obtaining indications of users who have evaluated the piece of content (e.g., by retrieving the information from evaluation information 723 on storage 723, or instead by receiving information provided by a merchant or other entity who indicated the content, such as from a content database data structure 173 or user database 778) and/or by obtaining an indication of one or more users who authored or otherwise supplied the piece of content (e.g., by receiving information provided by a merchant or other entity who indicated the content, such as from a content db 173 or user database 778). The CQA system then obtains indications of one or more assessed trust scores for each of the associated users for a piece of content, such as from information 722 on storage or by interacting with the UTSA system to obtain dynamically generated information, and obtains indications of any evaluations of the piece of content, such as from evaluation information 723 on storage. The CQA system then generates or updates one or more quality-related scores for each of the pieces of content, such as by combining the users' assessed trust score information with their evaluations, such as to weight the evaluations in a manner based on the assessed trust score information, and stores the assessed quality scores with information 721 on storage 720. The CQA system may further provide indications of some or all of the assessed quality scores to the merchant or other entity executing one of the computing systems 170 who indicated the content, such as to be stored in the content db 773 and to be used by a content manager system 790 in order to determine content to be provided to users.

In some embodiments, the CQA system may assess quality scores at times and/or in manners other than upon request, such as periodically or when additional evaluation information and/or assessed trust scores become available. In addition, in some embodiments the CQA system may further assign default quality scores (e.g., a score of zero) for a piece of content in situations in which sufficient assessment-related information is not available (e.g., when lacking an assessed trust score for a user who supplied the content and/or lacking any evaluations of the content), and only assess additional quality scores when sufficient information is available. Furthermore, in some embodiments the CQA system may further assess multiple quality-related scores for each of at least some of the pieces of content, such as to reflect assessments for different user groups (e.g., using stored user group information 728 and/or by automatically determining the user groups) and/or for each of multiple rating dimensions optionally indicated as information 726 on storage 720 (e.g., based on receiving evaluations for some or all of those dimensions). In addition, when the CQA system assesses multiple quality-related scores for a piece of content, the system may in some embodiments further assess a single overall quality score for the content pieces, such as by combining the other assessed quality scores in a manner that is weighted based on the types of the other scores.

When users of client computing systems 750 request information from a Web server computing system 770, such as by using Web browsers 759 executing in memory 757 of the computing systems 750 to interact with Web server 778 executing in memory 777 of computing systems 770, the computing systems 770 respond with appropriate information to be displayed or otherwise presented to the users, such as on display devices (not shown) of the I/O devices 754 of the computing systems 750. In some situations, a computing system 770 may be used by a Web merchant to provide shopping-related functionality to users who are customers of the merchant, such as to provide information about available products from a product database data structure 775 on storage 771 of the computing system 770. The merchant may further track and use various information about such users in the user database 778, as well as tracking and using information about various available pieces of content in the content database 773, such as for pieces of content supplied by users. In some embodiments, the Web server 778 may interact with a content manager system 790 executing in memory 777 of the computing system 770, with the content manager selecting appropriate pieces of content to provide to users. For example, when providing information about one or more available products or other items to a user, the content manager may select one or more pieces of user-supplied content to include along with the other information, such as based on assessed content quality scores for those pieces of content and/or information specific to the user. In addition, when new pieces of user-supplied content are received by a computing system 770, the content manager system or other component (not shown) may facilitate obtaining assessed content quality scores for those pieces of content, such as by supplying indications of them to the CQA system 740. Similarly, when new users are identified, the content manager system or other component (not shown) may facilitate obtaining assessed trust scores for those users, such as by supplying indications of them to the UTSA system 745. In other embodiments, the CQA system and/or UTSA system may instead obtain information about content pieces and/or users in other manners, such as by retrieving information from a computing system 770 (e.g., periodically), or by the computing system 770 providing information about all users and/or content pieces (e.g., periodically, such as to obtain updated trust scores for users and content quality scores for pieces of content).

In addition, while in some embodiments the CQA and/or UTSA systems are operated as part of a organization with one or more Web servers in order to support the one or more Web sites provided by those Web servers for the organization, in other embodiments one or both of the systems may also or instead interact with various external third-party computer systems, such as to provide assessment-based functionality to them as a service (e.g., as a Web service) and/or to exchange assessment-related information with them. Moreover, users can access the CQA and/or UTSA systems in a variety of ways in various embodiments. For example, some users (e.g., system developers and maintainers) may have physical access to the computing system 700, while other users may use client computer systems to remotely access one or both of the systems (e.g., via the Internet and/or the World Wide Web). In embodiments in which end-users can interact directly with the CQA and/or UTSA systems (e.g., to obtain assessed trust scores and/or assessed content quality scores), such users may use software or other functionality provided on the client computer systems (e.g., a browser 759) to interact with the CQA and/or UTSA systems. In addition, the CQA and/or UTSA systems may provide various feedback or other general types of information to users (e.g., in response to user requests), and this information can be presented to a local user on the display 711 of the computing system 700 or instead on one of the I/O devices 754 on a remote client system.

It should be appreciated that computing systems 700, 750 and 770 are merely illustrative and are not intended to limit the scope of the present disclosure. For example, computing system 700 may instead be comprised of multiple interacting computing systems or devices, and may be connected to other devices that are not illustrated, including through one or more networks such as the Internet or via the World Wide Web ("Web"). More generally, a "client" or "server" computing system or device may comprise any combination of hardware or software that can interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated systems may in some embodiments be combined in fewer systems or distributed in additional systems. Similarly, in some embodiments the functionality of some of the illustrated systems may not be provided and/or other additional functionality may be available.

It should also be appreciated that, while various elements are illustrated as being stored in memory or on storage while being used, these elements or portions of them can be transferred between memory and other storage devices for purposes of memory management and data integrity, and that these elements or portions of them may in other embodiments be stored in other memory and/or other storage devices, including ones not shown in this example embodiment. Alternatively, in other embodiments some or all of the software systems may execute in memory on another device and communicate with the illustrated computing system 700 via intercomputer communication. Some or all of the systems or data structures (and/or other contents) may also be stored (e.g., as software instructions or structured data) as contents of a computer-readable medium, such as a hard disk, a memory, a computer network or cellular wireless network or other data transmission medium, or a portable media article (e.g., a DVD or flash memory device) to be read by an appropriate drive or via an appropriate connection. Some or all of the systems and data structures (and/or other contents) can also be transmitted as contents of generated data signals (e.g., by being encoded in a carrier wave or otherwise included as part of an analog or digital propagated signal) on a variety of computer-readable data transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the inventive techniques may be practiced with other computer system configurations.

Figure 9:
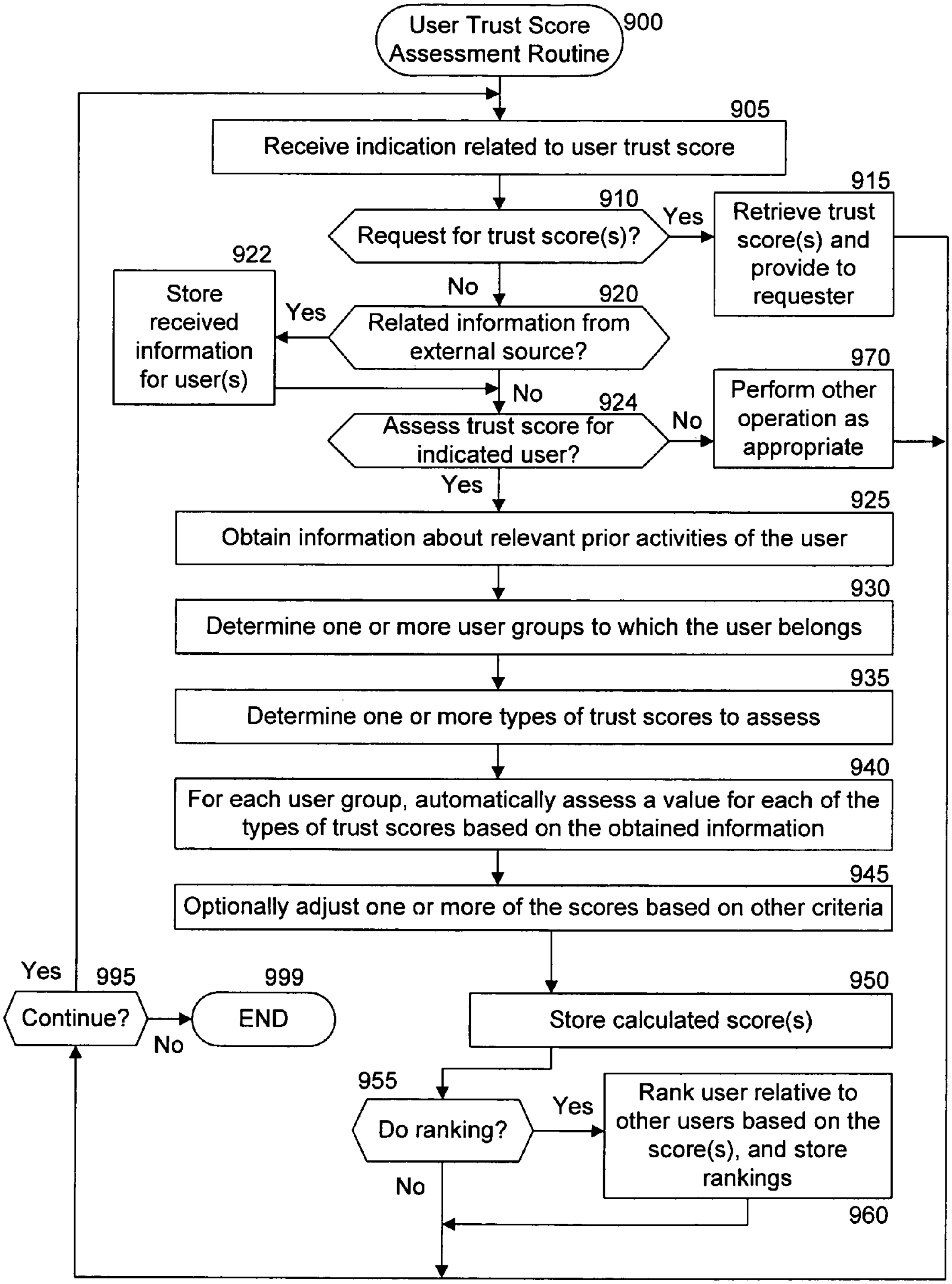
FIG. 9 is a flow diagram of an embodiment of a User Trust Score Assessment routine.

FIG. 9 is a flow diagram of an embodiment of a User Trust Score Assessment routine 900. The routine may, for example, be provided by execution of an embodiment of the UTSA system 745 of FIG. 7, such as to in this illustrated embodiment automatically assess trust scores of users based on information about the users, such as information about prior activities of the users. While users' trust scores are generated and stored for later use in this illustrated embodiment, in other embodiments a similar routine could be invoked dynamically to provide current assessments when requested based on whatever relevant information was available at that time.

The routine begins at step 905, where an indication is received that is related to one or more users and/or one or more trust scores of users. The routine continues to step 910 to determine whether the received indication is a request for one or more trust scores for one or more users, and if so continues to step 915 where the requested scores are retrieved and provided to the requester (e.g., an external organization) as appropriate. In some embodiments, the routine may require verification of authority of the requester to receive the requested scores. In some such embodiments, the scores are provided to external systems, such as to provide automatically calculated or otherwise assessed trust scores for users to third parties that could then use those scores in determining how to interact with those users and/or others.

If it was instead determined in step 910 that the indication received in step 905 was not a request for trust scores, the routine continues instead to step 920 to determine whether the indication received was of related information from an external source for one or more users, such as one or more reputation scores or other forms of trust scores that have been assessed by one or more external entities and/or other information about the user(s) for use in assessing one or more trust scores for the user(s) (e.g., information about prior activities of the user(s), such as based on interactions of the user(s) with the external entities). If so, the routine continues to step 922 to store the received information for later use. After step 922, or if it was instead determined in step 920 that information was not received from an external source, the routine continues to step 924 to determine whether to assess one or more trust scores for each of one or more users, such as based on a request or other indication received in step 905 or instead based on a periodic or other trigger. If not, the routine continues to step 970 to perform another operation as indicated if appropriate (e.g., adjusting one or more trust scores for one or more indicated users in an indicated manner, adjusting relative rankings of users based on their trust scores in a specified manner, performing a new user ranking calculation based on current user trust scores, etc.), but otherwise continues to perform steps 925-960 for each of the one or more users.

In step 925, the routine obtains information about relevant prior activities of a user, such as by retrieving stored information or otherwise requesting or receiving the information (e.g., by receiving the information in step 905). The routine then continues to step 930 to determine one or more user groups to which the user belongs, such as a single group of all users, or instead one or multiple clusters of users identified as being similar or otherwise related in one or more aspects. The routine then determines in step 935 one or more types of trust scores to assess for the user, such as a single type of trust score for all users, one or more types of trust score based on one or more roles or other activities of the user, one or more types of trust score to reflect different types of content with which the trust scores will be used (e.g., to use a trust score of the user for a particular type of content when the user is supplying and/or evaluating content of that type), etc. In step 940, the routine then automatically assesses a value for each type of trust score for each user group based on the obtained information, although in other embodiments may only assess some of the trust score types for some of the user groups and/or may first determine whether a specified threshold of information has been reached (e.g., having a sufficient amount of available relevant information, having at least a minimum amount of time passed or other criteria be satisfied since a prior assessment of one or more trust score(s) for the user, etc.) before proceeding with an assessment. Furthermore, in some embodiments the assessment of a trust score for a user may be based at least in part on one or more prior trust score assessments for the user, while in other embodiments the trust score assessment may be performed from scratch using the then-available underlying information. While not illustrated here, in some embodiments in which multiple trust scores are assessed for a user, one or more aggregate trust scores may further be assessed (e.g., one overall trust score, or one overall trust score for each user group), such as by combining the other assessed trust scores in a manner that is weighted for each of the those other trust scores.

After step 940, the routine continues to step 945 to optionally adjust one or more of the assessed trust scores based on other criteria, such as on other information available about the user (e.g., to reflect reputation scores for users). After step 945, the routine continues to step 950 to store the newly calculated trust scores for later use, and in this example continues to step 955 to determine whether to rank the user relative to other users at this time based on the assessed trust scores. If so, the routine continues to step 960 to rank the user accordingly and to store the resulting ranking for later use. After steps 915, 960 or 970, or if it was instead determined in step 955 not to do the ranking (e.g., if it is performed at other times, such as periodically or dynamically upon request, or if it is not performed for some embodiments), the routine continues to step 995 to determine whether to continue. If so, the routine returns to step 905, and if not the routine continues to step 999 and ends. While not illustrated here, in other embodiments the routine could further optionally provide one or more award indications to the user based on newly calculated scores for the user, such as to display indications of their new rank, of one or more of their new scores, of changes in their overall rank and/or scores over time, to provide a monetary or monetary equivalent adjustment to the user based on one or more of their new scores and/or ranking, etc.

Figure 10:
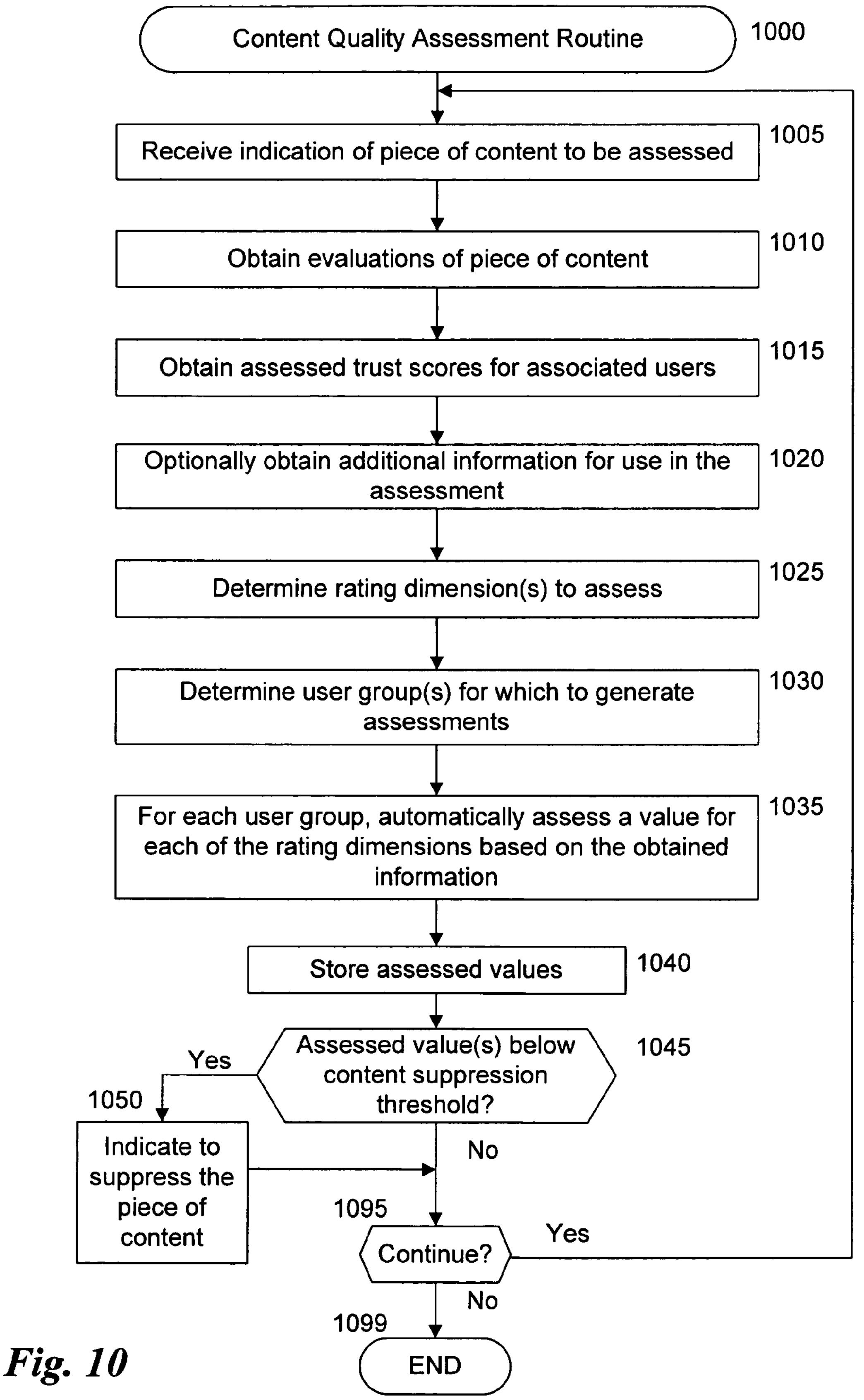
FIG. 10 is a flow diagram of an embodiment of a Content Quality Assessment routine.

FIG. 10 is a flow diagram of an embodiment of a Content Quality Assessment routine 1000. The routine may, for example, be provided by execution of an embodiment of the CQA system 740 of FIG. 7, such as to in this illustrated embodiment automatically assess one or more quality-related scores for pieces of content based at least in part on assessed trust scores for users associated with the content, such as users who supply and/or evaluate the content. While content quality scores are generated and stored for later use in this illustrated embodiment, in other embodiments a similar routine could be invoked dynamically to provide current assessments when requested based on whatever relevant information was available at that time.

The routine begins at step 1005, where an indication is received of one or more pieces of content to be assessed, whether as an initial assessment for a new piece of content or to generate a current assessment for a previously assessed piece of content. While not illustrated in this embodiment, in other embodiments the routine may further receive requests for content quality scores from requesters (e.g., external organizations) for pieces of content and respond accordingly (e.g., provide the requested scores if the requester is authorized to receive them), such as to provide requested content quality scores to third parties that could then use those scores in determining how to use that content or related content. Similarly, while not illustrated in this embodiment, in other embodiments the routine may further receive quality-related scores or other information (e.g., evaluations) for pieces of content from external sources, and if so respond accordingly (e.g., store the received information for later use as part of content quality assessment for the piece of content). Also, the routine may in some other embodiments perform a variety of other types of operations, such as if requested and appropriate (e.g., adjusting one or more quality-related scores for one or more indicated pieces of content in an indicated manner, adjusting relative rankings of content based on their quality-related scores in a specified manner, performing a new content piece ranking calculation based on current quality-related scores, etc.).

In this example embodiment, the routine continues after step 1005 to step 1010 in order to perform steps 1010-1050 for each of the one or more indicated pieces of content. In particular, in step 1010 the routine obtains information about prior evaluations by users for the piece of content, such as by retrieving stored information or otherwise requesting or receiving the information (e.g., by receiving the information in step 1005). The routine then continues to step 1015 to obtain one or more trust scores for each of one or more users identified as being associated with the piece of content, such as users who provided the obtained evaluations and/or one or more users who created or otherwise supplied the piece of content. In step 1020, the routine then optionally obtains other types of information for use in the assessment (e.g., information about the subject matter or other substance of the piece of content, such as an automatically generated determination of whether the piece of content is spam or pornography or is supplied by a human rather than a bot; evaluations and/or quality-related scores that are received from external sources; etc.), although in some embodiments some other types of information may not be used. After step 1020, the routine continues to step 1025 to determine one or more quality-related rating dimensions on which to assess the content (e.g., a single quality-related rating dimension based on an attribute such as usefulness or humorousness, a single quality-related rating dimension based on combining multiple such attributes, multiple quality-related rating dimensions each based on one of multiple distinct attributes, etc.), such as based on rating dimensions used in the obtained evaluations.

After step 1025, the routine continues to step 1030 to determine one or more user groups for which to generate quality-related assessments, such as a single group of all users, one of multiple clusters of users identified as being similar or otherwise related in one or more aspects, all of the multiple clusters of users, etc. In addition, when multiple trust scores are available for each of some or all of the users, the routine must further select one of the trust scores for use with each of the user groups (e.g., a user trust score that is associated with the user group), or instead a single trust score for use with all of the user groups (e.g., a user trust score associated with a current role of the user and/or with a type of the piece of content being assessed). Furthermore, in some embodiments the evaluations from users may be managed such that some or all evaluations are each used with a single one of the user groups (e.g., based on a user group to which the user who provided the evaluation belongs) or such that some evaluations may not be used (e.g., based on the user who provided the evaluation having one or more sufficiently low assessed trust scores; based on the evaluation being inappropriate for the current assessment, such as to use rating dimensions distinct from those currently being assessed; based on another indication that the evaluation is inappropriate; etc.).

In step 1035, the routine then automatically assesses a value for each of the rating dimensions for each user group based on the obtained information, although in other embodiments may only assess some of the rating dimensions for some of the user groups and/or may first determine whether a specified threshold of information has been reached (e.g., having a sufficient amount of available relevant information, having at least a minimum amount of time passed or other criteria be satisfied since a prior assessment of one or more score(s) for the content, etc.) before proceeding with an assessment. Furthermore, in some embodiments the assessment of a score for a piece of content may be based at least in part on one or more prior such assessments for the piece of content, while in other embodiments the assessment may be performed from scratch using the then-available underlying information. While not illustrated here, in some embodiments in which multiple quality-related scores are assessed for a piece of content, one or more aggregate quality scores may further be assessed (e.g., one overall quality score, or one overall quality score for each user group), such as by combining the other assessed quality-related scores in a manner that is weighted for each of the those other scores.

After step 1035, the routine continues to step 1040 to store the newly calculated trust scores for later use, and in other embodiments the routine may first optionally adjust one or more of the assessed quality-related scores based on other criteria, such as on other information available about the piece of content (e.g., to reflect one or more quality-related scores or ratings based on reputation scores for users). The routine then continues to step 1045 to determine whether one or more of the assessed quality-related scores are below a suppression threshold for content, and if so continues to step 1050 to indicate to suppress the piece of content, although in other embodiments the routine may instead provide the assessed quality-related scores to others who will instead make such suppression-related decisions. Also, while not illustrated here, in some embodiments the routine may further rank the piece of content relative to other pieces of content based on the assessed scores, and store or otherwise provide indications of the rankings for later use. After step 1050, or if it was instead determined in step 1045 to not suppress the piece of content, the routine continues to step 1095 to determine whether to continue. If so, the routine returns to step 1005, and if not the routine continues to step 1099 and ends.

Figure 8:
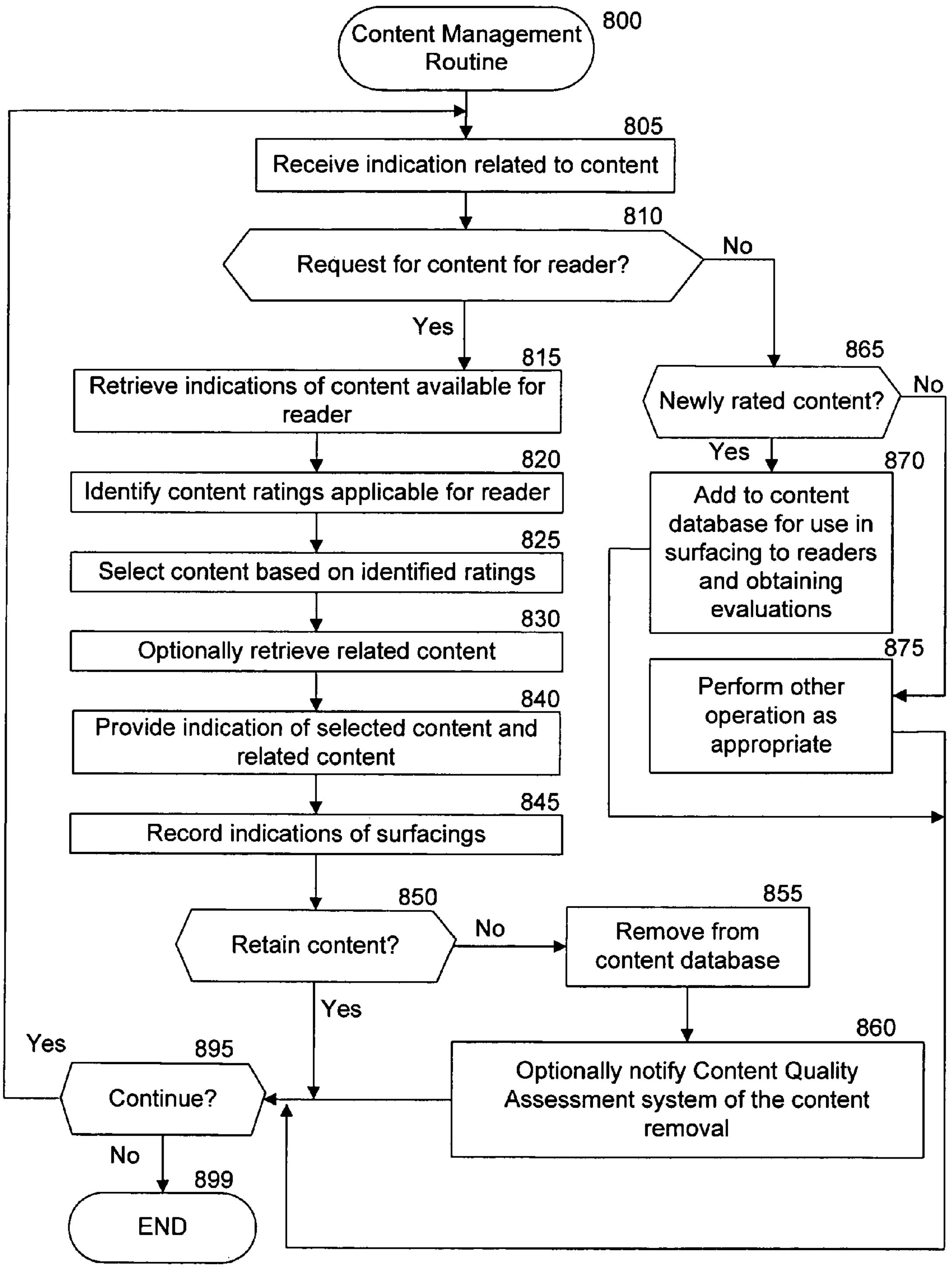
FIG. 8 is a flow diagram of an embodiment of a Content Management routine.

FIG. 8 is a flow diagram of an embodiment of a Content Management routine 800. The routine may, for example, be provided by execution of an embodiment of the content manager system 7490 of FIG. 7, such as to in this illustrated embodiment manage rated content (e.g., by identifying and/or providing appropriate content for readers, listeners, viewers, evaluators or other users). In the illustrated embodiment, the content being managed is textual information to be read by a user (e.g., user-provided reviews that have associated evaluations from other users), but in other embodiments a variety of other types of content could be similarly managed.

The routine begins in step 805, where an indication is received related to content. The routine continues to step 810 to determine whether the indication received was a request for content to provide to a reader or other user. If so, the routine continues to step 815 to retrieve indications of content available to be presented to the reader, as well as various related information for the content (e.g., surfacing information about previous instances of providing the content to readers). In some embodiments, certain content may be eliminated for consideration, such as based on content previously provided to the reader, on one or more groups to which the reader belongs, on preferences of the reader, etc. In addition, the related information that is retrieved in step 815 includes indications of previously generated quality-related ratings or scores for the content in the illustrated embodiment, although in other embodiments the content ratings could instead be dynamically generated each time the content is considered, such as by the Content Management routine interacting with an embodiment of the Content Quality Assessment routine.

After step 815, the routine continues to step 820 to identify content ratings that are appropriate for the reader for the indicated content (if multiple ratings are available, such as for different groups of readers). The routine then continues to step 825 to select one or more of the pieces of content for the reader based at least in part on the ratings of the content, such as to select the one or more highest-rated pieces of content or instead to make the selection in conjunction with other considerations (e.g., preferences of the reader). After step 825, the routine continues to step 830 to optionally retrieve related information to include with the content, such as one or more of the evaluations for the content, information about an item to which the subject matter of the content corresponds, information about any award indications or rankings to include with the content (e.g., badges for author and/or evaluator users based on their reputations, such as for those having high rankings and/or for those associated with the content, or information about a ranking of the piece of content itself), etc. A selection of only certain evaluations to be included can be made in a variety of ways, such as based on reputations of the evaluators that provided the evaluations (e.g., to allow evaluators with the highest reputations to receive the most presentations of their evaluations). The routine then continues to step 840 to provide an indication of the content and of the related information to the requester for presentation to the reader, although in other embodiments the routine could instead provide the information directly to the reader.

In step 845, the routine then records an indication of the surfacing of the content and related information for later use, and continues to step 850 to determine whether to discard the content or to instead retain it for later use, such as based on an amount of time that it has been in use, a number of surfacings that it has received, etc. If the content is not to be retained, the routine continues to step 855 to remove the content from the content database, and step 860 optionally notifies the Content Quality Assessment system to no longer assess quality-related scores for that content.

If it was instead determined in step 810 that the indication received in step 805 was not a request for content to select for a reader or other user, the routine continues instead to step 865 to determine whether an indication of newly rated content has been received. If so, the routine continues to step 870 to add the newly rated content along with its ratings to the content database for use in later surfacing to readers, evaluators and/or other users. If it was instead determined in step 865 that the received indication was not of newly rated content, the routine continues instead to step 875 to perform another indicated operation if appropriate (e.g., to remove content from the database, to modify information associated with stored content, etc.). After steps 860, 870, or 875, or if it was instead determined in step 850 to retain the content selected, the routine continues to step 895 to determine whether to continue. If so, the routine returns to step 805, and if not the routine continues to step 899 and ends.

The following provides additional details regarding one example of specific techniques for calculating trust scores for users and for using such trust scores when calculating quality-related scores for pieces of content. In particular, in this example a user's trust score will be used to predict a quality of content supplied by the user and/or of the quality of evaluations provided by the user, but the trust score will be determined based on prior activities of the user and other information about the user that do not involve supplying and/or evaluating such content. A user's trust score may also affect whether their supplied content is "surfaced" or otherwise provided to other users. The following also provides additional details regarding one example of specific techniques for calculating content quality (CQ) values for pieces of content, such as to predict quality of a piece of content based on only a limited number of evaluations and/or on information about the one or more users who supplied the content.

In these examples, each user and piece of content receives a unique identifier to allow it to be easily tracked and identified. In other embodiments, a single user and/or piece of content could instead be given multiple unique identifiers to represent different roles or uses, such as a role of a user as an author or other supplier versus an evaluator, or the role of content when being presented to different groups of users for which separate content ratings are tracked. In addition, each user is initially given a default trust score value (e.g., 0) since the user is an unknown entity. As the user taken actions that allows information to be generated for various trustworthiness factors, an updated trust score is developed for the user. Similarly, each piece of content is given an initial assessed quality-related score before evaluations of the piece of content are received, such as to reflect information about the one or more users who supplied the content piece and/or to reflect a default score value (e.g., 0), which will be updated if additional information (e.g., evaluations) is received to allow further assessment. Also, a piece of content is surfaced to users who are allowed to evaluate the content piece in a manner that does not provide any rating information or content-supplier user information, so as to eliminate bias in voting. An initial evaluation stage may also be used, such as with a threshold to end the evaluation stage once sufficient evaluations are received, or instead initial evaluations may be normalized in such a manner as to limit their effect on the quality-related assessment for a piece of content.

In this example, an evaluating user can provide two types of ratings for a piece of content, those being a binary quality indication of whether the piece of content is or is not helpful (referred to in this example as a "HelpfulVote" or "UnHelpfulVote", respectively), and a binary policing indication of whether the piece of content is or is not inappropriate (referred to in this example as a "ReportThisVote" or "NotReportThisVote", respectively), such as to identify content that includes, for example, pornography or derogatory information about individuals or groups of people. To produce a content quality score for a piece of content in this example based on the assessed trust scores of associated user, the following formula is used:

$$CQ(C) = S_1 R_{author}(\text{Context}(C)) + \left( S_2 \sum_{1..i}^{HelpfulVotes} R_{voter}(\text{Context}(C)) - S_3 \sum_{1..i}^{UnHelpfulVotes} R_{voter}(C) \right) I\left( \sum_{1..i} \text{impressions}, L_t, L_1 \right) + \left( S_4 \left( \sum_{1..i}^{ReportThisVotes} R_{voter}(\text{Context}(C)) \right)^a \right) I\left( \sum_{i} \text{impressions}, L_t, L_t \right) + S_5 \ln\left( \sum_{i} \text{impressions} \right)$$

$$\text{where } I(N, L_T, L_1) = \text{if}(N \le L_T) \Rightarrow L_1, \text{ else} \Rightarrow \frac{L_1 * L_t}{N}$$

In this expression, the terms are as follows: CQ represents the content quality score value that is assessed; C represents the content on which the CQ value is calculated; the S1-S5 values represent scaling constants that adjust the importance of each factor (e.g., nonlinear transforms); $R_{author}$ represents the assessed trust score of the user who supplied the content piece, which in this example depends on a context that reflects the type of the piece of content (e.g., if the user has multiple trust scores that each correspond to one of multiple content types); $R_{voter}$ represents the assessed trust score of a user who evaluated the piece of content for the context of the piece of content; Context (C) represents the context or type of the piece of content; I represents a measure of the number of impressions and is used to normalize portions of the CQ function; $L_1$ is a normalizing constant for I when the number N of impressions is less than a normalizing threshold $L_t$; and 'a' is a policing exponent which causes the policing inputs for inappropriateness evaluations to grow exponentially. When utilized, the mathematical expression yields a CQ value that can be used to determine the likely quality or other appropriateness of a piece of content.

In textual form, the formula first includes a term to use a scaled form of the content-supplying context-sensitive user's trust score, and then includes a summation of scaled forms of the evaluating users' quality evaluations weighted by each user's context-sensitive trust score, with the summation being normalized by the number of times the content was viewed by the users. Next, a summation is included of a scaled form of the evaluating users' inappropriateness policing evaluations weighted by each user's context-sensitive trust score, with the summation having an exponential growth and being normalized by the number of times the content was viewed by the users. Finally, a scaled logarithmic transform of the number of impressions is included. In other embodiments, other types of information than number of impressions may also be used to normalize or otherwise alter the equation, such as to include indications of a number of times that users have sent a piece of content to other users or added the content to a favorites or other list. Various other types of information could similarly be used, such as a number of times or how often a piece of content is updated, a number or degree of relationships of the piece of content to other information (e.g., to items available from a merchant), etc.

Once a piece of content is rated, the content management system can determine whether and how to surface the content, such as by comparing the CQ value with a predetermined CQ threshold value and/or with CQ values of other pieces of content.

In this example, assessing of a trust score for a user for a context includes using several trustworthiness factors, which in this example are factors 1201*a*-1201*i* illustrated in FIG. 1A, as well as associated information 1202*b*-1202*e* for each of those factors. In addition, additional associated information 1202*f*-1202*g* is used for the factors, as indicated.

| | 1202f Minimum Value | 1202g Maximum Value |
|---|---|---|
| 1201a | 0 for x = 0 | 100 for x = 9 |
| 1201b | 0 for x = 0 | 100 for x = 1080 |
| 1201c | 0 for x = 0 | 100 for x = 1 |
| 1201d | 0 for x = 0 | 100 for x >= 14 (mean + 2 sigma) |
| 1201e | 0 for x = 0 | 100 for x >= 10 (mean + 2 sigma) |
| 1201f | 0 for x = 0 | 100 for x >= 100 |
| 1201g | 0 for x = 0 | 100 for x >= 14 |
| 1201h | 0 for x = 0 | 100 for x >= 10 |
| 1201i | 0 for x = 0 | 100 for x >= 100 |

Thus, for example, for trustworthiness factor 1201*a* representing the relative decile value in dollars of total purchases by a user over the past 12 months, the illustrated information would generate a minimum value 1202*f* of 0 for a user in the bottom decile and a maximum value 1202*g* of 100 for a user in the top decile, using an exponential transform 1202*d* (as shown in FIG. 1A) and various parameters to the exponential transform (not shown), and with the resulting value given a weight 1202*b* of 1 and being scaled so as to gave a maximum value 1202*e* of 18. Each of the other trustworthiness factors 1201*b*-1201*i* have similar information.

In this example, identification of clusters or groups of similar users uses various types of information. In particular, in this example evaluating users' evaluation ratings (or "votes") will be analyzed to identify clusters of users, such as by using a k-means cluster analysis in order to keep the number of permutations relatively small (e.g., 10). These 10 clusters will be as distinct as possible, and the differing content quality scores for pieces of content in the various clusters will be subsequently compared to develop an assessment of the amount of difference for each cluster. The number of clusters may then be adjusted, such as to, for example, reduce the number of clusters in order to conserve storage space and reduce computation time if 10 clusters provide an unnecessary level of detail. When the users are customers of a merchant, a cluster can be considered to be an algorithmically defined market segment. In addition, to minimize the number of votes and number of content pieces used for the clustering, in this example a subset of the users who have cast at least 10 votes will initially be used, and a piece of content will initially be considered only if it has more than one vote cast on it by the subset of users, although these constraints may subsequently be removed.

Each user, cluster tuple will be stored, and there will be only one cluster for each user in this example, regardless of the number of different pieces of content or other information entities that the user votes on. The per-cluster content quality values can be tested in various ways. For example, in situations in which some pieces of content are contentious when clusters are not used (e.g., when one reasonably sized group of relatively trustworthy users consistently rate some pieces of content highly, and another reasonably sized group of relatively trustworthy users consistently rate those pieces of content low), it would be expected that such contentious impacts will be minimized or eliminated when clusters are used (e.g., by having the different groups of users in different clusters). In addition, an attempt will be made to identify a subset of 10 to 20 characteristic pieces of content for each cluster, such as content pieces that are likely to receive very helpful or very unhelpful votes from a cluster when other clusters would not be so strongly biased. Furthermore, content suppression thresholds may be modified or used such that one cluster that dislikes a piece of content does not cause it to be suppressed for other clusters that do like it.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners. The data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for an electronic marketplace to select customer-supplied item reviews for presentation to other customers based on automatically assessed quality of the item reviews, the assessed quality of an item review being based at least in part on automatically calculated trust scores of customers associated with the item review, the method comprising:

tracking activities of customers of the electronic marketplace in performing multiple types of interactions with the electronic marketplace, the tracking being performed by one or more programmed computing systems of the electronic marketplace;

for each of the customers, automatically calculating a trust score for the customer based at least in part on the tracked activities of the customer, the calculated trust score for a customer reflecting a level of trust granted by the electronic marketplace regarding future activities of the customer, the automatic calculating of the trust score for the customer being performed by the one or more programmed computing systems;

receiving multiple textual item reviews that are each supplied by one of the customers and that are each related to one of multiple items provided by the electronic marketplace to customers; and for each of the item reviews, using the item review by, automatically assessing an initial quality of the item review based at least in part on the calculated trust score for the customer from whom the item review was received, the assessing such that a calculated trust score reflecting a high level of trust will produce a higher assessed initial quality than a calculated trust score reflecting a low level of trust, the calculated trust score of the customer being based at least in part on types of interactions with the electronic marketplace that are unrelated to providing content or to evaluating content, the automatic assessing of the initial quality being performed by the one or more programmed computing systems;

automatically determining whether to present the item review to other customers based at least in part on whether the automatically assessed initial quality of the item review is sufficiently high, the automatic determining being performed by the one or more programmed computing systems; and if the item review is presented to other customers, receiving evaluations of the item review from each of at least some of the other customers, the received evaluations including numerical ratings of the item review for multiple rating dimensions that are related to distinct aspects of the item review, the numerical rating for a rating dimension indicating an assessment by one of the other customers of a degree to which an aspect of the item review for that rating dimension is satisfied;

automatically assessing an updated quality of the item review based at least in part on the automatically assessed initial quality and based at least in part on the numerical ratings of the received evaluations, the automatic assessing performed so as to weight the numerical ratings received from customers based on calculated trust scores for those customers, the automatic assessing of the updated quality being performed by the one or more programmed computing systems; and if it is determined to continue presenting the item review to other customers based at least in part on the automatically assessed updated quality of the item review being sufficiently high, presenting the item review to other customers, so that quality of item reviews that are supplied by and evaluated by customers may be automatically assessed in a manner to reflect automatically calculated levels of trust in the customers based on multiple types of interactions of the customers with the electronic marketplace, and wherein each of the one or more programmed computing systems includes at least one computer processor.

2. The method of claim 1 further comprising:

receiving multiple other pieces of content that are each supplied by one of the customers and that are each related to one of the multiple items provided by the electronic marketplace to customers, the multiple other customer-supplied pieces of content being of one or more types distinct from item reviews;

automatically assessing a quality of each of the other pieces of content based at least in part on a calculated trust score for the customer from whom the piece of content was received and/or on calculated trust scores for customers from whom evaluations of the piece of content are received; and determining whether to provide each of the other pieces of content to other customers based at least in part on whether the automatically assessed quality of the piece of content is sufficiently high.

3. The method of claim 1 wherein the tracked activities of each of the customers used in calculating trust scores for the customer include multiple of prior activities involving purchasing items from the electronic marketplace, prior activities to corroborate an identity of the customer, and prior activities to contribute information to the electronic marketplace of potential benefit to other customers.

4. The method of claim 3 wherein the tracked activities of the customers used in calculating trust scores for the customers do not include activities related to providing item reviews or to evaluating item reviews.

5. The method of claim 3 wherein the automatic calculating of the trust score for each of at least some of the customers is further based at least in part on prior actions taken by the electronic marketplace involving information contributed by the customer.

6. The method of claim 3 wherein the automatic calculating of the trust score for each of at least some of the customers is further based at least in part on information received by the electronic marketplace from one or more unaffiliated organizations that have assessed a level of trust for the customer based on interactions of the customer with those organizations.

7. The method of claim 1 further comprising, for each of at least one of the item reviews supplied by a customer and before the one item review is presented to other customers, automatically determining not to present the one item review to other customers based at least in part on the automatically assessed initial quality of the one item review being sufficiently low due to the calculated trust score of the customer who supplied the one item review, and in response suppressing presentation of the one item review to other customers.

8. The method of claim 1 wherein, for each of at least some of the item reviews, automatic assessing of quality of the item review is performed in such a manner as to assess multiple distinct degrees of quality for the item review that are each associated with one or more distinct groups of customers, the assessing of the degree of quality associated with each of the groups of customers being based at least in part on evaluations received from other customers who belong to that group, and wherein the automatic determining of whether to present each of the at least some item reviews to other customers includes determining whether to present the item review to the customers in each of one or more of the distinct groups based on the assessed degree of quality for the item review that is associated with the group.

9. The method of claim 8 wherein, for each of at least some of the customers, automatic calculating of the trust score for the customer is performed in such a manner as to calculate multiple distinct trust scores for the customer that are each associated with one or more distinct activities of the customer, and wherein the automatic assessing of the quality of each of at least some of the item reviews based at least in part on the calculated trust score for one of the at least some customers is performed in such a manner as to be based on one of the distinct trust scores for the one customer that is associated with an activity of the one customer corresponding to the assessing.

10. The method of claim 1 wherein the distinct aspects of the item reviews to which the multiple rating dimensions relate include multiple of usefulness, accuracy, informativeness, inappropriateness, and humorousness, and wherein each of the multiple rating dimensions has an associated weight such that the automatic assessing of the updated quality of an item review based at least in part on the numerical ratings of the received evaluations is performed so as to weight the numerical ratings based on the associated weights for the rating dimensions to which the numerical ratings correspond.

11. The method of claim 1 further comprising performing multiple other types of interactions with customers in a manner based on the calculated trust scores of the customers such that customers whose calculated trust scores reflect a high level of trust will receive more benefits than customers whose calculated trust scores reflect a low level of trust.

12. A computer-implemented method for selecting information to provide to customers of an electronic marketplace based on an automatic assessment of quality of the information, the method comprising:

receiving from a customer a piece of content related to an available item;

automatically determining a trust score for the customer based at least in part on prior activities of the customer at the electronic marketplace, at least some of the prior activities of the customer being unrelated to providing pieces of content to the electronic marketplace, the automatic determining of the trust score being performed by at least one of one or more programmed computing systems;

for each of one or more content rating dimensions, automatically determining an initial quantitative assessment of the received piece of content for the content rating dimension based at least in part on the determined trust score for the customer, the automatic determining of the initial quantitative assessment being performed by at least one of the one or more programmed computing systems;

after providing the received piece of content to other customers, receiving multiple evaluations of the piece of content from at least some of the other customers, each received evaluation including a quantitative assessment for each of one or more of the content rating dimensions;

for each of at least one of the content rating dimensions, automatically determining an updated quantitative assessment of the received piece of content for the content rating dimension based at least in part on combining quantitative assessments for the content rating dimension from the received evaluations, the combining such that determined trust scores for the at least some other customers from prior activities of those other customers are used to weight the quantitative assessments in the evaluations received from those other customers, the automatic determining of the updated quantitative assessment being performed by at least one of the one or more programmed computing systems; and determining whether to provide the piece of content to one or more additional customers based at least in part on one or more of the automatically determined quantitative assessments for the piece of content, and wherein each of the one or more programmed computing systems includes at least one computer processor.

13. The method of claim 12 further comprising, before the providing of the received piece of content to the other customers, determining that at least one of the automatically determined initial quantitative assessments of the received piece of content does not exceed a suppression threshold, and suppressing the received piece of content based on the suppression threshold so as to prevent the providing of the received piece of content to the other customers.

14. The method of claim 13 further comprising, after the suppressing of the received piece of content, automatically determining a revised initial quantitative assessment of the received piece of content for a content rating dimension based at least in part on a revised determined trust score for the customer from whom the piece of content was received, and halting the suppressing of the received piece of content if the automatically determined revised initial quantitative assessment exceeds the suppression threshold.

15. The method of claim 13 wherein the suppression threshold is predefined.

16. The method of claim 12 wherein the determining of whether to provide the piece of content to one or more additional customers includes determining that at least one of the automatically determined updated quantitative assessments of the received piece of content does not exceed a suppression threshold, and in response suppressing the received piece of content so that it is not provided to additional customers.

17. The method of claim 16 wherein the suppressing is further based on determining that all of the automatically determined updated quantitative assessments of the received piece of content do not exceed the suppression threshold.

18. The method of claim 12 wherein the determining of whether to provide the piece of content to one or more additional customers includes determining to provide the piece of content to additional customers, and further comprising providing the piece of content to additional customers.

19. The method of claim 18 wherein one or more quantitative assessments are automatically determined for each of numerous other pieces of content, and wherein the determining of whether to provide the piece of content to one or more additional customers is further based on a comparison of one or more of the automatically determined quantitative assessments for the piece of content to automatically determined quantitative assessments for the numerous other pieces of content.

20. The method of claim 12 wherein the piece of content includes textual information authored by the customer from whom the piece of content is received.

21. The method of claim 12 wherein the piece of content includes one or more images generated by the customer from whom the piece of content is received.

22. The method of claim 12 wherein the piece of content includes an audio clip generated by the customer from whom the piece of content is received.

23. The method of claim 12 wherein the piece of content includes a group of related pieces of information that is created by the customer from whom the piece of content is received.

24. The method of claim 12 wherein automatic determining of a quantitative assessment of the received piece of content for each of at least one of the content rating dimensions includes determining a quantitative assessment of the received piece of content for each of multiple distinct content rating dimensions.

25. The method of claim 24 wherein the automatic determining of a quantitative assessment of the received piece of content for each of at least one of the content rating dimensions further includes automatically determining an overall assessment of the received piece of content based at least in part on multiple of the determined quantitative assessments of the received piece of content.

26. The method of claim 24 wherein the multiple content rating dimensions are each related to a distinct attribute of the piece of the content.

27. The method of claim 24 wherein the multiple content rating dimensions reflect multiple of usefulness, helpfulness, humorousness, inappropriateness and accuracy.

28. The method of claim 12 wherein the quantitative assessment of the received piece of content for a content rating dimension is a content quality score that reflects a degree of quality for the piece of content for that content rating dimension.

29. The method of claim 12 wherein the automatic determining of the updated quantitative assessment of the received piece of content for one of the content rating dimensions is further based in part on the automatically determined initial quantitative assessment of the received piece of content for that one content rating dimension.

30. The method of claim 12 wherein automatic determining of a quantitative assessment of the received piece of content for one of the content rating dimensions includes determining multiple distinct quantitative assessments of the received piece of content for the one content rating dimension, each of the multiple distinct quantitative assessments being associated with one of multiple distinct groups of customers.

31. The method of claim 30 wherein the automatic determining of each of the multiple distinct quantitative assessments of the received piece of content for the one content rating dimension is based on evaluations received from customers who belong to the one group of customers with which the quantitative assessment is associated.

32. The method of claim 30 wherein the determining of whether to provide the piece of content to one or more additional customers is further based at least in part on one of the multiple distinct quantitative assessments of the received piece of content that is associated with a group of customers that includes the one or more additional customers.

33. The method of claim 30 further comprising automatically identifying the multiple distinct groups of customers so as to identify similar customers based on analysis of information related to the customers.

34. The method of claim 12 wherein automatic determining of a quantitative assessment of the received piece of content for one of the content rating dimensions includes determining multiple distinct quantitative assessments of the received piece of content for the one content rating dimension, each of the multiple distinct quantitative assessments being associated with a distinct customer.

35. The method of claim 12 wherein automatic determining of a quantitative assessment of the received piece of content based on an automatically determined trust score for a customer includes selecting one of multiple automatically determined trust scores for the customer for use in the automatic determining of the quantitative assessment, the selecting being based at least in part on a type of the received piece of content such that the selected trust score is associated with the type.

36. The method of claim 12 wherein automatic determining of a quantitative assessment of the received piece of content based on an automatically determined trust score for a customer includes selecting one of multiple automatically determined trust scores for the customer for use in the automatic determining of the quantitative assessment, the selecting being based at least in part on a role of the customer related to the received piece of content such that the selected trust score is associated with the role.

37. The method of claim 12 wherein the prior activities of the at least some other customers on which the determined trust scores for those other customers are based include prior activities of those customers at the electronic marketplace that are unrelated to evaluating pieces of content from the electronic marketplace.

38. The method of claim 37 wherein the all of the prior activities of the at least some other customers on which the determined trust scores for those other customers are based and all of the prior activities of the customer from whom the piece of content is received are unrelated to evaluating pieces of content from the electronic marketplace and are unrelated to providing pieces of content to the electronic marketplace.

39. The method of claim 12 wherein the prior activities of the at least some other customers on which the determined trust scores for those other customers are based and the prior activities of the customer from whom the piece of content is received are of multiple types that each are associated with one of multiple trustworthiness factors for use in assessing trustworthiness of the customer.

40. The method of claim 12 wherein the prior activities of the at least some other customers on which the determined trust scores for those other customers are based and the prior activities of the customer from whom the piece of content is received include multiple of prior activities involving purchasing items from the electronic marketplace, prior activities to corroborate an identity of the customer, and prior activities to contribute information to the electronic marketplace of potential benefit to other customers.

41. The method of claim 40 wherein the automatic determining of a trust score for each of at least some customers is further based at least in part on prior actions taken by the electronic marketplace involving information supplied by the customer.

42. The method of claim 40 wherein the automatic determining of a trust score for each of at least some customers is further based at least in part on information received by the electronic marketplace from one or more external entities.

43. The method of claim 42 wherein the one or more external entities are unrelated to the electronic marketplace, and wherein the information received from the one or more external entities for each of the at least some customers includes an indication of a level of trust assessed for the customer by the one or more external entities based on interactions of the customer with those entities.

44. The method of claim 12 further comprising providing to one or more external entities for use by the external entities an indication of one or more automatically determined trust scores for a customer and/or an indication of one or more automatically determined quantitative assessments for the received piece of content.

45. The method of claim 12 wherein the automatic determining of a trust score for each of at least one of the customers includes automatically determining multiple distinct trust scores for the customer.

46. The method of claim 45 wherein the automatic determining of the multiple trust scores for the customer includes determining a trust score associated with each of multiple types of activities of the customer.

47. The method of claim 45 wherein the automatic determining of the multiple trust scores for the customer includes determining a trust score associated with each of multiple types of content.

48. The method of claim 12 further comprising automatically determining trust scores for each of multiple users who are not customers of the electronic marketplace.

49. The method of claim 12 further comprising automatically determining content quality scores for each of multiple pieces of content that are not available from the electronic marketplace.

50. A computer-readable storage medium whose contents include instructions that when executed configure a computing device to select information to provide to users based on an automatic assessment of quality of the information, by performing a method comprising:

receiving an indication of information supplied by a first user;

after providing indications of the information to other users, receiving evaluations of the information from each of at least some of the other users;

automatically assessing the quality of the information based at least in part on automatically determined trust scores for the other users in such a manner that the automatically determined trust score for each of the other users is used to influence an effect of the evaluation of that other user on the assessed quality, the automatically determined trust score for each of the other users being based at least in part on prior activities of that other user that are not related to evaluating information or to supplying information, the automatic assessing of the quality being performed by the configured computing device; and automatically determining a manner of using the information based at least in part on the automatically assessed quality of the information, the automatic determining being performed by the configured computing device.

51. The computer-readable storage medium of claim 50 wherein the automatic determining of the manner of using the information includes determining whether to provide the information to each of one or more users, and wherein the method further comprises, before the providing of the information to the other users, automatically predicting the quality of the information based at least in part on an automatically determined trust score for the first user that is based at least in part on prior activities of the first user that are not related to supplying information, and preventing the providing of the information to the other users if the automatically predicted quality of the information is sufficiently low.

52. The computer-readable storage medium of claim 51 wherein the method further comprises, before the receiving of the indication of the information supplied by the first user, automatically determining the trust scores for each of the first user and the other users based on the prior activities of that user.

53. The computer-readable storage medium of claim 50 wherein the automatic assessing of the quality of the information is performed in such a manner as to generate multiple distinct quality assessments for the information that are each associated with one or more distinct groups of users, the generating of the quality assessment associated with each of the groups of users being based at least in part on evaluations received from other users who belong to that group, and wherein the automatic determining of whether to provide the information to additional users is based on the quality assessment associated with one of the groups to which the additional users belong.

54. The computer-readable storage medium of claim 50 wherein the automatically assessed quality of the information is a quantitative assessment of the information for each of one or more rating dimensions.

55. The computer-readable storage medium of claim 50 wherein the supplied information is related to an item available from a merchant, and wherein the information is supplied by the first user for use by other users.

56. The computer-readable storage medium of claim 50 wherein the computer-readable medium is a memory of the computing device.

57. A computing system configured to select information to provide to users based on an automatic assessment of quality of the information, comprising:

one or more processors;

a content quality assessment system that is configured to, when executed by at least one of the one or more processors:

automatically assess a predicted degree of quality of a piece of content supplied by a first user for use by other users, the predicting of the degree of quality being based at least in part on a trust score for the first user that is automatically determined based at least in part on prior activities of the first user that are not related to supplying pieces of content for use by other users; and automatically update the assessed degree of quality of the piece of content based at least in part on evaluations of the piece of content received from multiple other users to whom the piece of content was made available and on automatically determined trust scores for the other users such that the automatically determined trust score for each of the other users is used to influence an effect of the evaluation of that other user on the updated assessed degree of quality; and a content manager system that is configured to, when executed by at least one of the one or more processors, automatically determine whether to make the supplied piece of content available to other users based at least in part on the automatically assessed predicted degree of quality of the piece of content.

58. The computing system of claim 57 wherein the content quality assessment system is further configured to automatically assess an updated degree of quality of the piece of content based at least in part on trust scores for multiple other users associated with the piece of content that are automatically determined based on prior activities of the other users.

59. The computing system of claim 58 further comprising a user trust score assessment system configured to automatically determine the trust scores for the first user and the other users based on the prior activities.

60. The computing system of claim 57 wherein the content manager system is further configured to suppress the supplied piece of content from being made available to other users if the automatically assessed predicted degree of quality of the piece of content is sufficiently low.

61. The computing system of claim 57 wherein the automatic assessing of the predicted degree of quality of the piece of content is performed in such a manner as to generate multiple distinct predicted quality assessments for the piece of content that are each associated with one or more distinct groups of users, and wherein the automatic determining of whether to provide the piece of content to other users is based on the predicted quality assessment associated with one of the groups to which the other users belong.

62. The computing system of claim 57 wherein the automatically assessed predicted degree of quality of the piece of content is a predicted quantitative assessment of the piece of content for each of one or more rating dimensions.

63. The computing system of claim 57 wherein the supplied piece of content is related to an item available from a merchant.

64. The computing system of claim 57 wherein the content quality assessment system and the content manager system each include software instructions for execution by the one or more processors of the computing system.

65. The computing system of claim 57 wherein the content quality assessment system consists of a means for automatically assessing a predicted degree of quality of a piece of content supplied by a first user for use by other users, the predicting of the degree of quality being based at least in part on a trust score for the first user that is automatically determined based at least in part on prior activities of the first user that are not related to supplying pieces of content for use by other users, and wherein the content manager system consists of a means for automatically determining whether to make the supplied piece of content available to other users based at least in part on the automatically assessed predicted degree of quality of the piece of content.

* * * * *